(12) United States Patent
Meek et al.

(10) Patent No.: US 7,660,705 B1
(45) Date of Patent: Feb. 9, 2010

(54) BAYESIAN APPROACH FOR LEARNING REGRESSION DECISION GRAPH MODELS AND REGRESSION MODELS FOR TIME SERIES ANALYSIS

(75) Inventors: Christopher A. Meek, Kirkland, WA (US); David E. Heckerman, Bellevue, WA (US); Robert L. Rounthwaite, Fall City, WA (US); David Maxwell Chickering, Bellevue, WA (US); Bo Thiesson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 868 days.

(21) Appl. No.: 10/102,116

(22) Filed: Mar. 19, 2002

(51) Int. Cl.
*G06F 17/10* (2006.01)
(52) U.S. Cl. ............................................. 703/2; 706/50
(58) Field of Classification Search .................. 703/2; 706/50, 52
See application file for complete search history.

(56) References Cited

U.S. PATENT DOCUMENTS

| | | | |
|---|---|---|---|
| 5,544,281 A | 8/1996 | Maruoka et al. | |
| 5,809,499 A | 9/1998 | Wong et al. | |
| 5,835,682 A | 11/1998 | Broomhead et al. | |
| 5,949,678 A | 9/1999 | Wold et al. | |
| 6,125,105 A | 9/2000 | Edwads et al. | |
| 6,336,108 B1 * | 1/2002 | Thiesson et al. | 706/20 |
| 6,345,265 B1 * | 2/2002 | Thiesson et al. | 706/52 |
| 6,363,333 B1 | 3/2002 | Deco et al. | |
| 6,408,290 B1 * | 6/2002 | Thiesson et al. | 706/52 |
| 6,496,816 B1 * | 12/2002 | Thiesson et al. | 706/52 |
| 6,529,891 B1 * | 3/2003 | Heckerman | 706/52 |
| 6,532,454 B1 | 3/2003 | Werbos | |
| 6,560,586 B1 | 5/2003 | Liang et al. | |
| 6,574,587 B2 | 6/2003 | Waclawski | |
| 6,735,580 B1 | 5/2004 | Li et al. | |
| 6,742,003 B2 * | 5/2004 | Heckerman et al. | 707/104.1 |
| 6,778,929 B2 | 8/2004 | Egi | |
| 6,807,537 B1 * | 10/2004 | Thiesson et al. | 706/52 |
| 6,853,920 B2 | 2/2005 | Hsiung et al. | |
| 6,882,992 B1 | 4/2005 | Werbos | |
| 6,928,398 B1 | 8/2005 | Fang et al. | |
| 6,987,865 B1 | 1/2006 | Szeliski et al. | |
| 7,092,457 B1 | 8/2006 | Chugg et al. | |
| 7,139,703 B2 | 11/2006 | Acero et al. | |
| 2002/0072882 A1 | 6/2002 | Kruger et al. | |

(Continued)

OTHER PUBLICATIONS

Heckerman, D. and Breese, J.S. "Causal Independence for Probability Assessment and Inference Using Bayesian Networks." IEEE Transactions on Systems, Man and Cybernetics. Nov. 1996. vol. 26, Issue 6. pp. 826-831.*

(Continued)

*Primary Examiner*—Paul L Rodriguez
*Assistant Examiner*—Luke Osborne
(74) *Attorney, Agent, or Firm*—Lee & Hayes, PLLC

(57) ABSTRACT

Methods and systems are disclosed for learning a regression decision graph model using a Bayesian model selection approach. In a disclosed aspect, the model structure and/or model parameters can be learned using a greedy search algorithm applied to grow the model so long as the model improves. This approach enables construction of a decision graph having a model structure that includes a plurality of leaves, at least one of which includes a non-trivial linear regression. The resulting model thus can be employed for forecasting, such as for time series data, which can include single or multi-step forecasting.

44 Claims, 10 Drawing Sheets

U.S. PATENT DOCUMENTS

| | | |
|---|---|---|
| 2003/0039867 A1 | 2/2003 | Meek et al. |
| 2003/0046038 A1 | 3/2003 | Deligne et al. |
| 2003/0055614 A1* | 3/2003 | Pelikan et al. .................. 703/2 |
| 2003/0065409 A1 | 4/2003 | Raeth et al. |
| 2003/0176931 A1* | 9/2003 | Pednault et al. ............... 700/31 |
| 2004/0068199 A1 | 4/2004 | Echauz et al. |
| 2004/0068332 A1 | 4/2004 | Ben-Gal et al. |
| 2004/0101048 A1 | 5/2004 | Paris |
| 2004/0260664 A1 | 12/2004 | Thiesson et al. |
| 2005/0015217 A1* | 1/2005 | Weidl et al. .................. 702/185 |
| 2005/0096873 A1 | 5/2005 | Klein |
| 2006/0074558 A1 | 4/2006 | Williamson et al. |
| 2006/0129395 A1 | 6/2006 | Thiesson et al. |
| 2006/0247900 A1 | 11/2006 | Brocklebank |
| 2007/0150077 A1 | 6/2007 | Bocharov et al. |
| 2008/0010043 A1 | 1/2008 | Thiesson et al. |

OTHER PUBLICATIONS

Chickering, D.M. et al. "Efficient Determination of Dynamic Split Points in a Decision Tree." Proc. IEEE Int'l Conf. on Data Mining. Nov. 29-Dec. 2, 2001. pp. 91-98.*

Heckerman, D. et al. "Dependency Networks for Inference, Collaborative Filtering, and Data Visualization." The Journal of Machine Learning Research. Sep. 2001. vol. 1. pp. 49-75.*

Berzuini, C. and C. Larizza. "A Unified Approach for Modeling Longitudinal and Failure Time Data, with Application in Medical Monitoring." IEEE Transactions on Pattern Analysis and MAchine Intelligence. Feb. 1996. vol. 18, Issue 2, pp. 109-123.*

Meek, C. "Annotated Bibliography of Papers by Christopher Meek." Mar. 2005. Printed Dec. 28, 2006. http://research.microsoft.com/~meek/mypapers.htm.*

Meek, C. et al. "Autoregressive Tree Models for Time-Series Analysis." Jan 10, 2002. http://research.microsoft.com/~meek/papers/dmart.ps&pub=63.*

U.S. Appl. No. 10/463,145, filed Jun. 17, 2003, Thiesson, et al.

U.S. Appl. No. 11/319,894, filed Dec. 28, 2005, Bocharov, et al.

Craig F. Ansley, "An algorithim for the exact likelihood of a mixed autoregressive-moving average process", 1979, pp. 59-65, Biometrika, printed in Greet Britain.

Neil A. Gershenfeld and Andreas S. Weigend, The Future of Time Series: Learning and Understanding, Time Series Prediction, 1994, pp. 1-70, Addison Wesley, New York, NY.

P. A. W. Lewis, et al., Modeling Time Series by Using Multivariate Adaptive Regression Splines (MARS), Time Series Prediction, 1994, pp. 297-318, Addison Wesley, New York, NY.

Howell Tong, Threshold Models in Non-Linear Time Series Analysis, 1983, 323 pages, Springer-Verlag, New York, NY.

Karalic, Aram. "A Employing Linear Regression in Regression Tree Leaves", *European Conference on Artificial Intelligence*, 1992, pp. 1-2.

Chipman, Hugh, et al. ABayesian Treed Models, Feb. 2001, pp. 1-29.

Kapetanios, George. A Threshold Models for Trended Time Series,1999, pp. 1-32.

Gers. Felix A. Applying LSTM to Time Series Predictable Through Time-Window Approaches, 2001, pp. 1-8.

Cogger, Kenneth O. AModern Regression Methods: A Comparative Discussion@, Apr. 19, 2001, pp. 1-11.

Chickering, David Maxwell. AA Bayesian Approach to Learning Bayesian Networks with Local Structure@, Aug. 1997. pp. 1-19.

Bach, F.G., et al., Learning Graphical Models For Stationary Time Series, (2004), IEEE Transactions On Signal Processing, to appear, 11 Pages.

Bo Thiesson, et al. ARMA Time Series Modeling with Graphical Models. Proceedings of the Twentieth Conference on Uncertainity in Arificial Intelligence, 2004, pp. 552-560. AUAI Press.

Bo Thiesson, et al. Efficient Gradient Computaion for Conditional Gaussian Models. Proceedings of 10th Int'l Workshop on Artificial Intelligence and Statistics. The Society for Artificial Intelligence and Statistics, Jan. 2005, 8 Pages.

Bo Thiesson. Score and Information for Recursive Exponential Modelswith incomplete Data. Proceedings of the Thirteenth Conference on uncertainity in AI, 1997, pp. 453-463. Morgan Kaufmann Publishers.

Thomas Dean and Keiji Kanazawa, Probabilistic Temporal Reasoning, Technical Report, May 1988, Brown University, pp. 524-528.

Cooper, G., et al., A Model For Temporal Probabilistic Reasoning (Technical Report KSL-88-30), (1988), Stanford University, Section On Medical Informatics, Stanford, California, 24 Pages.

Dempster, et al. Maximum Likelyhood for Incomplete Data Via the EM Algorithm, 1997, Journal of the Royal Statistical Soceity, B39, pp. 1-38.

Jones. Maximum Likelyhood Fitting of ARMA Models to Time Series with Missing Observations. 1980, Technometrics, pp. 389-395.

Matthias Seeger. Bayesian Gaussian Process Models: PAC-Bayesian Generalization Error Bounds and Sparse Approximation, Jul. 2003, 327 Pages.

Ghahramani, Z., Learning Dynamic Bayesian Networks. In Adaptive Processing Of Sequences And Data Structures. Lecture Notes in Artificial Intelligence, (1998), p. 168-197, Springer-Verlag, Berlin.

Kenneth O. Cogger, Modern Regression Methods: A Comparative Discussion, peakconsulitng.com/coggerdc.pdf, 2001,12 pages, Peak Consulting.

Lauritzen, S. L., et al., Stable Local Computation With Conditional Gaussian Distributions, Statistics and Computing, (2001), pp. 11, 191-203.

John Binder, et al. Adaptive Probabilistic Networks with Hidden Variables, Machine Learning, 1997, pp. 213-244.

"Theory Combination: An Alternative to Data Combination"; Kai Ming Ting; pp. 1-22.

"Inter-Class Mllr for Speaker Adaptation"; Sam-Joo Doh, et al.; Carnegie Mellon University.

"Structural Maximum a Posteriori Linear Regression for Fast HMM Adaption"; Olivier Siohan, et al.; Bell Laboratories—Lucent Technologies.

"Efficient Locally Weighted Polynomial Regression Predictions"; Andrew W. Moore, et al.; Carnegie Mellon University.

"Theory Combination: An Alternative to Data Combination"; Kai Ming Ting; pp. 1-22, Oct. 1996.

"Inter-Class Mllr for Speaker Adaptation"; Sam-Joo Doh, et al.; Carnegie Mellon University, Jun. 2000.

"Structural Maximum a Posteriori Linear Regression For Fast HMM Adaption"; Olivier Siohan, et al.; Bell Laboratories—Lucent Technologies, Sep. 2000.

"Efficient Locally Weighted Polynomial Regression Predictions"; Andrew W. Moore, et al.; Carnegie Mellon University, Jul. 1997.

* cited by examiner

BAYESIAN APPROACH FOR LEARNING REGRESSION DECISION GRAPH MODELS AND REGRESSION MODELS FOR TIME SERIES ANALYSIS

TECHNICAL FIELD

The present invention relates generally to data modeling and analysis, and more particularly to a Bayesian approach for learning regression decision graph models and to regression models for time series analysis.

BACKGROUND

With the advent of the Internet, and especially electronic commerce ("e-commerce") over the Internet, the use of data analysis tools, has increased. In e-commerce and other Internet and non-Internet applications, databases are generated and maintained that have large amounts of information. Such information can be analyzed, or "mined," to learn additional information regarding customers, users, products, etc.

Data mining (also known as Knowledge Discovery in Databases—KDD) has been defined as "The nontrivial extraction of implicit, previously unknown, and potentially useful information from data." Data mining can employ machine learning, statistical and visualization techniques to discover and present knowledge in a form that is easily comprehensible to humans.

One area relating to decision theory in which there is significant amount of research is decision trees. A decision tree data structure corresponds generally to an acyclic, undirected graph where nodes are connected to other respective nodes via a single path. The graph is acyclic in that there is no path that both emanates from a vertex and returns to the same vertex, where each edge in the path is traversed only once. A probabilistic decision tree is a decision tree that is used to represent a conditional probability distribution for a target variable given some set of predictor variables. As compared to a table, which is another way to represent a conditional probability distribution when all variables are discrete, a tree is generally a more efficient way of storing probabilities because of its ability to represent equality constraints within a conditional probability distribution.

A decision graph is a further generalization of a decision tree. Similar to a decision tree, a decision graph can represent equality constraints in a conditional probability distribution. In contrast to a decision tree, however, non-root nodes in a decision graph can have more than one parent. This characteristics enables a richer set of relationships to be represented by a decision graph than by a decision tree. For example, relationships between a non-root node and multiple parent nodes can be represented in a decision graph by corresponding edges interconnecting the non-root node with its parent nodes.

There are two traditional approaches for constructing statistical models, such as decision trees or decision graphs, namely, a knowledge-based approach and a data-based approach. Using the knowledge-based approach, a person (known as a knowledge engineer) interviews an expert in a given field to obtain the knowledge of the expert about the field of expertise of the expert. The knowledge engineer and expert first determine the distinctions of the world that are important for decision making in the field of the expert. These distinctions correspond to the variables in the domain of interest. For example, if a decision graph is to be used to predict the age of a customer based on the products that customer bought in a store, there would be a variable for "age" and a variable for all relevant products. The knowledge engineer and the expert next determine the structure of the decision graph and the corresponding parameter values that quantify the conditional probability distribution.

In the data-based approach, the knowledge engineer and the expert first determine the variables of the domain. Next, data is accumulated for those variables, and an algorithm is applied that creates one or more decision graphs from this data. The accumulated data comes from real world instances of the domain. That is, real world instances of decision making in a given field.

There has been much research in modeling techniques to facilitate analysis of time series data. One approach relates to the use of neural nets. While neural nets can provide reasonable predictive performance, they tend to be difficult to interpret and computationally expensive to learn. Further neural nets usually are implemented as black boxes, which provided little useful information about interrelationships between variables.

Other approaches for time series analysis include self-exciting threshold autoregressive models (SETAR), as disclosed in *Threshold models in Nonlinear Time Series Analysis*, Tong H., Springer-Verlag, New York (1983), and adaptive smooth threshold regressive models (ASTAR), as disclosed in *Modeling time series by using mars*, by Lewis, P., Ray, B., and Stevens, J. In Time series prediction, pp. 297-318, Addison Wesley, New York (1994). Both the SETAR and ASTAR models can be considered piece-wise linear models. When described in terms of a decision tree, the SETAR models are limited to a single split variable. The ASTAR models are obtained by the application of the well-known multiple adaptive regression splines (MARS) system to time-series data.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention relates to a Bayesian model selection approach to construct a decision graph having a plurality (e.g., two or more) leaves, at least one of which leaves includes a linear regression. The model is referred to as a regression decision graph model. A regression decision graph model having linear regressions at more than one leaf corresponds a piecewise linear regression model in which one or more leaves contains a linear regression, such as a nontrivial linear regression at one or more leaves.

According to the present invention, the Bayesian model selection approach can be implemented during a structure search phase and/or a parameter search phase associated with learning the regression model. This Bayesian aspect, for example, includes computing a Bayesian score of the model during one or both of such searches. The Bayesian approach to scoring facilitates building the model structure, including situations when there is little or no hold out data (e.g., situations when it is desirable to use all or most of the data).

Another aspect of the present invention relates to the structure search employed during construction of the regression model. The structure search, for example, employs a greedy search algorithm to grow the model in an iterative fashion, provided that the model continues to improve with each iteration. The greedy search can employ split leaf and/or merge operations to affect changes in the model structure.

After the model structure is learned (e.g., via the greedy search algorithm), another aspect of the present invention relates to additional adjustments, which can be performed relative to the model, to improve the model. These adjustments correspond to learning parameters of the model. The adjustments can include adding or removing one or more variables (e.g., regressors) relative to one or more of the leaves that improve the model score. The type of adjustments (e.g., adding or removing of a variable) may depend on whether a given regressor exists at a particular leaf as constructed during the structure search. It is to be appreciated, however, according to an aspect of the present invention, that such parameter adjustments can be performed on almost any type of regression model. Additionally, the adjustments can include a merge operation in which any pair of leaf nodes can be merged into a single leaf node. If the two merged leaf nodes do not both have the same (single) parent, the resulting single leaf node will necessarily have at least two parents.

By way of particular example, an auto-regressive tree model (ART model) is a specific instance of a regression decision graph in which the structure of the graph is constrained to be a tree, and where the leaves in the tree specify the probability of the target variable at a particular time as a linear regression on the value of that same variable at previous times. An ART model might be used to predict the stock price of a company based on the closing prices of the previous few days. An ART model constructed according to an aspect of the present invention is particularly well suited for forecasting. An ART model modeling time series data can be used to perform one-step or multi-step forecasting.

To the accomplishment of the foregoing and related ends, certain illustrative aspects of the invention are described herein in connection with the following description and the annexed drawings. These aspects are indicative, however, of a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

Figure 1A:
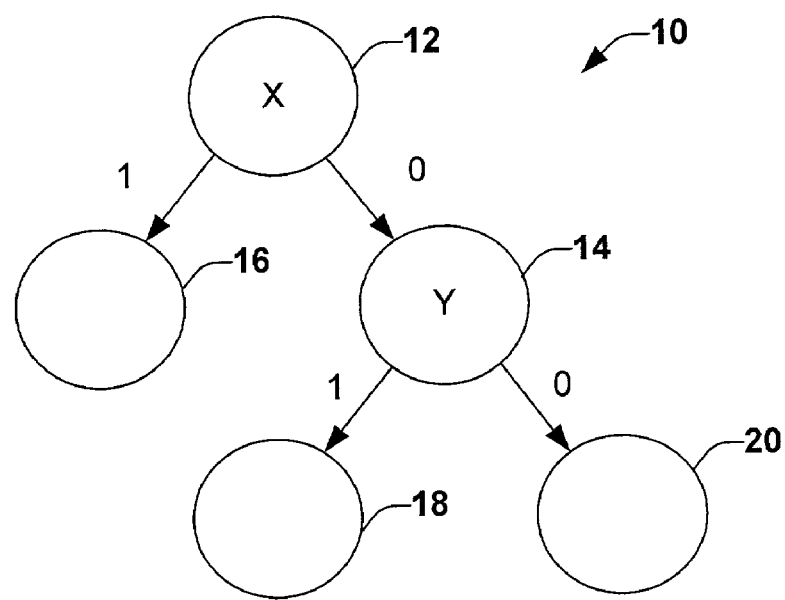
FIG. 1A is an example of a regression decision graph model in accordance with one aspect of the present invention.

The present invention provides a system and method for learning a regression decision graph model. As described herein, the model structure and/or model parameters can be learned using a greedy search algorithm applied iteratively so as to grow the model while the model improves. The approach further employs a Bayesian model selection approach. The present approach facilitates construction of a decision graph having a model structure that includes a plurality of leaves, at least one of which includes a non-trivial linear regression. The resulting model thus can be employed for forecasting, and is particularly well suited to model and to predict relative to time series data.

Nomenclature

Throughout the Description of the Invention, upper-case letters to refer to variables, and lower-case letters are used to refer to values.

Basic Regression Graph Model

A regression-graph model represents a conditional probability distribution of a target variable T given some set of predictor variables $P_1, \ldots, P_n$. In particular, given a set of values $p_1, \ldots, p_n$, the conditional probability distribution $p(T|P_1=p_1, \ldots, P_n=p_n)$ is obtained from a decision graph as follows. Each node in the decision graph contains a "split" on one (or more) predictor variables. A split maps every value of one (or more) predictor variables to exactly one child of the corresponding node in the decision graph. Corresponding to values $p_1, \ldots, p_n$, we can therefore identify a unique leaf node by starting at the root node of the graph and following the appropriate edges. Within the leaf node, the regression-graph model stores the conditional probability $p(T|P_1=p_1, \ldots, P_n=p_n)$.

An autoregressive tree (ART) model is a particular instance of a regression-graph model for which (1) the structure of the decision graph is a tree; that is, every node in the graph has exactly one parent except for the root node (which has zero parents) and (2) the conditional probability distributions stored in the leaves are linear regressions. Typically, the linear regressions in the leaves of an ART model are functions of previous values of the target variable. For example, let X(i) denote the value of the target variable at time i. X(i) might be the price of a particular company's stock at the end of day i. A leaf distribution might specify that the mean of X(i) is equal to 5*X(i−4)−4*X(i−1) and the variance of X(i) is equal to 3. The predictor variables used in the splits of the ART model may or may not correspond to previous values of the target variable.

It is to be appreciated that the ART model is a specific example of a regression-graph model that is useful for explaining various aspects of the present invention. The invention is not limited to ART models. In particular, the structure of a regression-graph model, according to an aspect of the present invention, need not be a tree, and the distributions at the leaves need not be linear regressions. The target variable may be a continuous variable, an integer variable, a categorical variable, or any type for which a conditional probability distribution can be defined.

Both decision graphs and their specialization to decision trees represent equality constraints in the associated conditional probability distributions. In particular, there may be many combination of predictor values $p_1, \ldots, p_n$ that lead to the same leaf node in the decision graph, and thus the conditional probability distribution is necessarily specified by the same set of parameters.

FIG. 1A depicts a decision graph represented as a regression tree model 10, which can be an autoregressive tree (ART), constructed in accordance with an aspect of the present invention. The regression tree 10 includes a root node 12, an intermediate non-leaf node 14 and three leaf nodes 16, 18 and 20. The non-leaf nodes 12 and 14 include associated Boolean functions related to variables represented by the model 10. Each of the leaves 16, 18 and 20 includes one or more linear regressions. Each leaf thus can be considered itself an autoregressive model.

In the illustrated example, there is split at the root node 12 that results in leaf node 16 and non-leaf node 14. Similarly, there is a split at the node 14, which provides leaf nodes 18 and 20. The nodes 12 and 14 thus represent split variables, with each split corresponding to a Boolean operation relative to the respective split variables. Each of the leaves 16, 18 and 20, for example, has a linear regression using all available variables in the set of variables for provided for the model, which variables can be determined from expert knowledge in the particular domain for which the model is being created. As described herein, the split variables and corresponding split values for each split variable are selected during construction of the model to improve the model score, which is a Bayesian score according to an aspect of the present invention. Each split variable can include one or more possible split value. The decision as to which split to make for a given split variable thus depends on the score provided by a split value associated with the split variable.

Figure 1B:
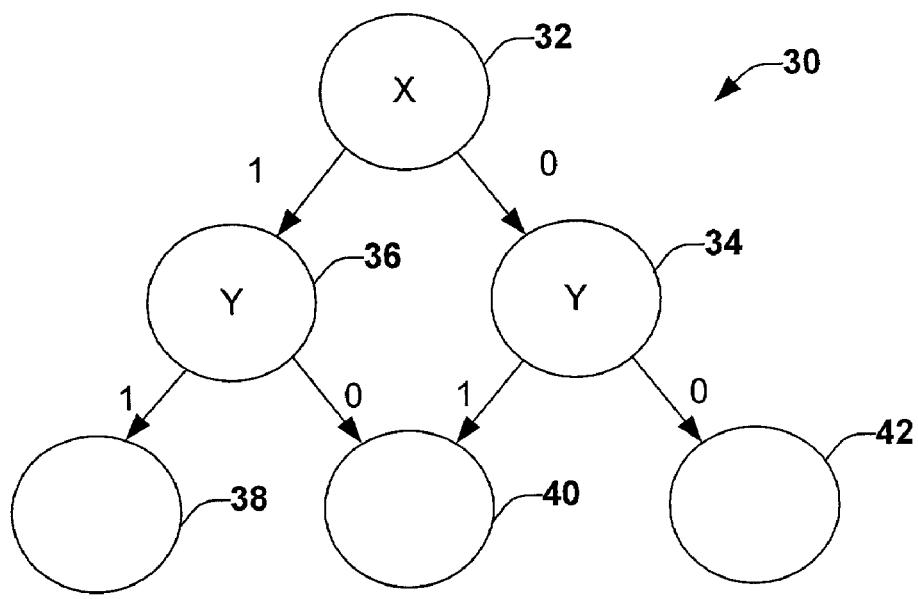
FIG. 1B is an example of a regression decision graph model in accordance with another aspect of the present invention.

By way of illustration, FIG. 1B illustrates an example of a decision graph 30 that can be constructed in accordance with an aspect of the present invention. As used herein, a decision graph is a generalization of a decision tree that, similar to a decision tree, can represent equality constraints among local parameters. In FIG. 1B, the decision graph includes a root node 32, intermediate nodes 34 and 36, and three leaves 38, 40 and 42. In contrast to a decision tree, such as depicted in FIG. 1A, the leaf node 40 has more than one parent, namely it corresponds to a merge. This enables a richer set of relationships to be represented by the model structure than for a decision tree. During construction of the decision graph 30, split operations also can be performed to grow the graph to improve the model score, as described herein.

By way of illustration, when generating the decision graph 30, in accordance with an aspect of the present invention, a merge operation can be performed relative to two leaves or other non-root nodes, such as if the merge improves the Bayesian score of the decision graph more than performing a split leaf operation. The merge operation can be implemented for two or more leaves, for example, where there are similar or identical distributions at such leaves. As depicted in FIG. 1B, the merge results in the node 40 having two parent nodes 34 and 36.

Figure 2:
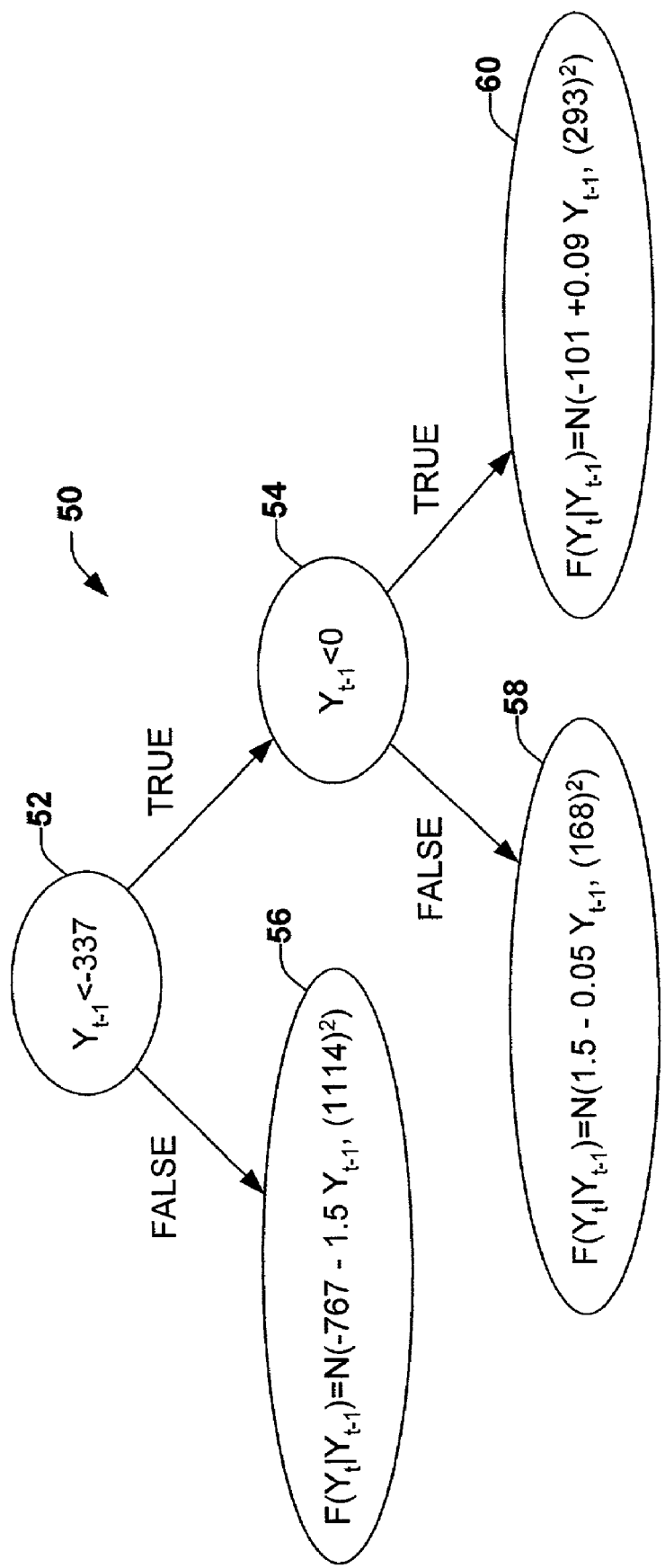
FIG. 2 is an example of a regression decision graph model implemented in accordance with an aspect of the present invention.

By way of further illustration, FIG. 2 depicts a decision graph in the form of an ART 50 having linear regressions at its leaves. The ART 50 is a piecewise linear autoregressive model appropriate for time series analysis. For purposes of ease of explanation, a temporal sequence of variables is denoted by $Y=(Y_1, Y_2, \ldots, Y_T)$. Time-series data is a sequence of values for these variables denoted by $y=(y_1, y_2, \ldots, y_T)$. For purposes of ease of explanation, much of the following description is mainly directed to models that are probabilistic, stationary, and p-order Markov models ($p \geq 0$). That is, the following model takes the form:

$$P(y_t|y_1, \ldots, y_{t-1}, \theta) = f(y_t|y_{t-p}, \ldots, y_{t-1}, \theta), p < t \leq T \quad \text{Eq. 1}$$

where $f(\bullet|\bullet,\theta)$ is a family of conditional probability distributions that represents the functional form of the model and ? are the model parameters. Stationarity means that the dependence of $y_t$ on the preceding variables does not change with time. The p-order Markov assumption means that, given the previous p observations, $y_t$ is independent of the remaining previous observations. It is to be appreciated that the function $f(y_t|y_{t-p}, \ldots, y_{t-1}, \theta)$ is often called a regression where $Y_t$ is the target variable and $(Y_{t-p}, \ldots, Y_{t-1})$ are the regressor variables. In view of the description herein, those skilled in the art will understand and appreciated that these models are well suited for forecasting future observations in accordance with an aspect of the present invention.

A linear autoregressive model of length p, denoted AR(p), is described by Eq. 1 in which $f(y_t|y_{t-p}, \ldots, y_{t-1}, \theta)$ is a linear regression that can be expressed as:

$$f(y_t | y_{t-p}, \ldots, y_{t-1}, \theta) = N\left(m + \sum_{j=1}^{p} b_j y_{t-j}, \sigma^2\right) \quad \text{Eq. 2}$$

where $N(\mu,\sigma^2)$ is a normal distribution with mean $\mu$ and variance $\sigma^2$, and $\theta=(m, b_1, \ldots, b_p, \sigma^2)$ are the model parameters.

As mentioned above, an autoregressive tree (ART) model, according to an aspect of the present invention, can be a piecewise linear autoregressive model in which the regions for the autoregressive models are defined by a decision tree, and the leaves of the decision tree contain linear autoregressive models. Furthermore, while, for sake of convenience, much of the foregoing and subsequent discussions are directed to ART models structured as decision trees according to the present invention, those skilled in the art will understand and appreciate that the present invention is equally applicable to other types of decision graphs. In addition, while certain applications of the present invention are described in connection with modeling time series data, it is to be understood and appreciated that the present invention and its associated methods are useful for regression or prediction generally.

Referring again to FIG. 2, the ART indicated at 50 includes a root node 52 having a split that defines a non-leaf node 54 and a leaf node 56. The node 54 corresponds to a split variable that defines leaves 58 and 60 having linear regressions defined by the respective illustrated formulas. In this example, the ART model has three regions defined using the variable $Y_{t-1}$ and each leaf 56, 58, 60 contains an AR(1) model described by the equation shown at each respective leaf.

For the example of FIG. 2, the root node 52 of the ART model 50 tests whether $Y_{t-1} < -337$. Thus, each edge is associated with the formula for its parent node if the label on a given edge is "true". Similarly, each of the edges in the tree is labeled "false" are associated with the negation of the formula for each respective parent node. In application of the ART 50 to data (e.g., time series data), each leaf 56, 58, 60 is associated an indicator function, $\phi_i$, that returns 1 when the conjunction of all the formulas associated with the edges along a path from the root node 52 to the respective leaf $l_i$ are true, and 0 otherwise. For example, the indicator function associated with the leaf 54 in FIG. 2 returns 1 when $(X_{t-1} < -337)^{\wedge} (X_{t-1} \geq 0)$, and 0 otherwise.

Another aspect of the present invention relates to a subset of ART models, which are referred to herein as autoregressive tree models of length p, denoted ART(p). An ART(p) model is an ART model in which each leaf of the decision tree contains an autoregressive model of length p (e.g., an AR(p) model), and the split variables for the decision tree are chosen from among the previous p variables in the time series. In ART(p) models, each non-leaf node in a decision tree has associated with it a Boolean formula that is a function of the p variables, for example, $Y_{t-p}, \ldots, Y_{t-1}$.

Considering, for example, that the ART 50 of FIG. 2 corresponds to an ART(p) model. The ART(p) model can be defined by Equation 1 such that:

$$f(y_t \mid y_{t-p}, \ldots, y_{t-1}, \theta) = \qquad \text{Eq. 3}$$
$$\prod_{i=1}^{L} f_i(y_t \mid y_{t-p}, \ldots, y_{t-1}, \theta_i)^{\varphi_i} = \prod_{i=1}^{L} N\left(m_i + \sum_{j=1}^{p} b_{ij} y_{t-j}, \sigma_i^2\right)^{\varphi_i}$$

where:
L is the number of leaves,
$\theta = (\theta_1, \ldots, \theta_L)$, and
$\theta_i = (m_i, b_{i1}, \ldots, b_{ip}, \sigma_i^2)$ are the model parameters for the linear regression at leaf $l_i$, where $i=1, \ldots, L$.

ART(p) (and ART) models are generalizations of AR models because an ART(p) model with a decision tree having only a single leaf is an AR(p) model. However, an ART(p) model, in accordance with an aspect of the present invention, is more powerful than traditional AR models because they can model non-linear relationships in time-series data. Furthermore, ART(p) models can represent periodic time-series data. Various advantages of ART and ART(p) models will be better appreciated based on the description provided herein. Furthermore, those skilled in the art will understand and appreciate that the application of the present invention to other types of decision graphs will be relatively straightforward based on the description relating to ART models.

Bayesian Learning Approach:

Before proceeding with a description of systems and techniques that can be employed to construct a regression decision graph model, in accordance with an aspect of the present invention, a brief description of a Bayesian approach that can be employed to facilitate learning the model is described. The Bayesian approach can be used to learn both model structure and model parameters. For purposes of ease of explanation, the following Bayesian approach is described in connection with learning a stationary, p-order Markov time-series model from data, although it is to be appreciated that such an approach is by no means limited to constructing a regression model for time series data or to a p-order Markov model. The model parameters are represented above in Eq. 1 as quantities θ. The model structure includes all other aspects of the model. For example, structure in an ART model consists of the decision-tree structure and the indicator functions at the leaves, which are linear regressions.

In the Bayesian approach, there are a collection of alternative models $s_1, \ldots s_S$ having unknown model parameters $\theta_{s_1}, \ldots, \theta_{s_S}$, respectively. Uncertainty about the structure and parameters can be expressed by placing probability distributions on the structure and parameters, namely, p(s) and p(θ|s). Bayes' rule can be applied in conjunction with the data d to infer posterior distributions over these quantities, which can be expressed as: p(s|d) and p(θ|d, s). Predictions can be made by averaging over these distributions. Alternatively, a Bayesian-model selection approach can be employed that selects the structure s that has the highest posterior probability p(s|d), and make predictions according to p(θ|d, s) for that structure s.

A key quantity in this Bayesian approach is the posterior probability of model structure p(s|d). By Bayes' rule, the posterior probability is given by $$p(s \mid d) = p(d \mid s) * \frac{p(s)}{p(d)}.$$

Because p(d) is a constant across alternative structures, the product p(s)*p(d|s) can be employed to choose the best model. This product is referred to hereinafter as the Bayesian score for the model.

The first term in the Bayesian score, namely p(s) is simply the structure prior. The second term is equal to ∫p(d|θ$_s$, s) p(θ$_s$|s) dθ$_s$, where p(d|θ$_s$, s) is the likelihood of the data. The quantity p(d|s), which represents the likelihood averaged over the uncertainty in θ$_s$, is called the marginal likelihood. It is to be appreciated that when the marginal likelihood is used for model selection, this quantity balances the fit of the model structure to data with the complexity of the model. One way to understand this fact is to note that, when the number of cases N is large, the marginal likelihood can be approximated by $$p(d \mid \hat{\theta}, s) - \frac{|\theta_s|}{2} \log N \qquad \text{Eq. 4}$$

where $\hat{\theta}$ is the maximum-likelihood estimator of the data.

The first quantity in this expression represents the degree to which the model fits the data, which increases as the model complexity increases. The second quantity, in contrast, penalizes model complexity.

Now, turning to the application of the Bayesian approach to learning a stationary, p-order Markov time-series model. According to Eq. 1, the likelihood of the data is $$p(y_{p+1}, \ldots, y_T \mid y_1, \ldots, y_p, \theta, s) = \qquad \text{Eq. 5}$$
$$\prod_{t=p+1}^{T} f(y_t \mid y_{t-p}, \ldots, y_{t-1}, \theta, s)$$

It is to be appreciated that Eq. 5 is written to include the structure s as a variable to emphasize that the Bayesian approach is being employed to learn model parameters and model structure. It further is to be appreciated that the first p observations have been omitted from Eq. 5 because Eq. 5 corresponds to a p-order Markov model, which cannot predict the first p observations.

Given the likelihood of Eq. 5, learning can proceed as described herein, including placing priors on model structures and model parameters and using Bayes' rule. Greater details associated with searching and scoring for the regression decision graph model, in accordance with an aspect of the present invention, are described below.

A central aspect of learning a linear regression model using a Bayesian approach is a transformation of the single sequence $y=(y_1, \ldots, y_T)$ to a set of cases $x^1, \ldots, x^{T-p}$. The transformation is given by:

$$x^i=(x_1^i, \ldots, x_{p+1}^i), \text{ for } 1 \leq i \leq T-p, \text{ where } x_j^i=y_{i+j-1}. \quad \text{Eq. 6}$$

This transformed data set is referred to herein as the length p transformation of the time-series data set. The transformation is applied to the data set prior to applying the Bayesian learning method. A given length p transformation, for example, can be determined according to a perceived or known periodicity for a given variable. As an example, consider the sequence $y=(1, 3, 2, 4)$. Then, the length-2 transformation is $x^1=(1, 3)$, $x^2=(3, 2)$, $x^3=(2, 4)$, and the length-3 transformation is $x^1=(1, 2, 3)$, $x^2=(2, 3, 4)$.

Given this transformation, the likelihood of the model in Eq. 5 can be rewritten as follows:

$$p(y_{p+1}, \ldots, y_T \mid y_1, \ldots, y_p, \theta, s) = \prod_{t=p+1}^{T} f(x_{p+1}^t \mid x_1^t, \ldots, x_p^t, \theta, s) \quad \text{Eq. 7}$$

This likelihood is the likelihood for an ordinary regression model with target variable $X_{p+1}$ and regressor variables $X_1, \ldots, X_p$. Thus, stationary, p-order Markov model time-series can be learned using any ordinary regression technique, including decision trees or, more generally, decision graphs.

It is to be appreciated that the foregoing general approach to learning has a complication. For example, when selecting among p-order Markov models having different values of p, the number of product terms in the likelihood of Eq. 7 (or Eq. 5) will vary, making comparisons difficult. One approach to overcome this complication is to choose a small maximum value p' of p for consideration, and including only those terms for $t \geq p'$ in the product. Another approach is to divide the marginal likelihood of a model by the number of cases used to compute the marginal likelihood. The latter approach can be justified by the prequential interpretation of the marginal likelihood, such as described in *Statistical Theory: The prequential approach (with discussion)*, Journal of the Royal Statistical Society A, by Dawid P., 147, 178-292 (1984).

Figure 3:
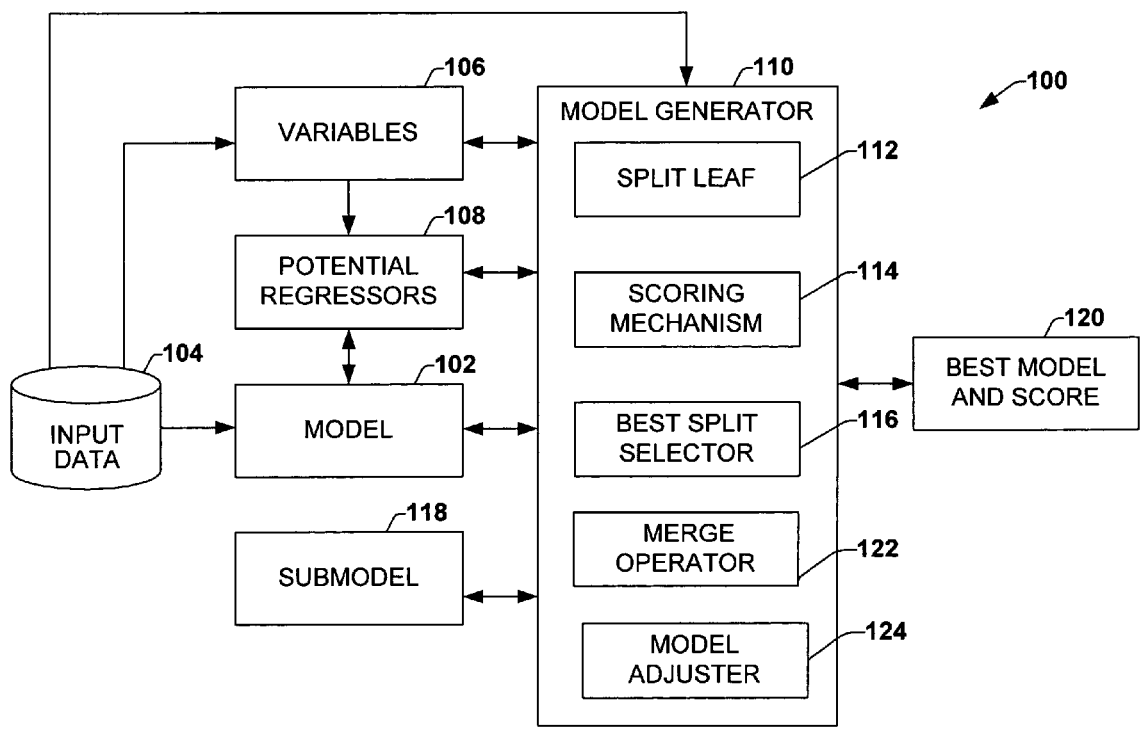
FIG. 3 is example of a system to construct a regression decision graph model in accordance with an aspect of the present invention.

Model Generator—Searching and Scoring for Regression Decision Graph Models:

FIG. 3 illustrates a block diagram of a system 100 programmed and/or configured to generate a regression decision graph model 102 in accordance with an aspect of the present invention. The system 100 generates the model 102 using a Bayesian learning approach, as described herein. The model 102 is generated from input data 104, which can include empirical data and/or expert data. In one aspect of the present invention the input data 104 corresponds to a sample of time series data collected over a relevant time period, although the present invention is not limited to time series data.

The input data 104 being modeled is converted to a set of variables 106 suitable for regression analysis. The variables include a target variable and predictor variables. The predictor variables can be discrete variables and continuous variables. The variables 106, for example, are defined based on expert knowledge in the domain for which the model applies. The data set is employed to learn the model 102, which corresponds to a decision graph having linear regressions at its leaves. A set of potential regressor variables 108 is derived from the set of variables 104. The potential regressors 108, which are continuous variables, are predictor variables that may be useful in modeling the target variable.

The potential regressors 108 can be ordered according to their likely usefulness relative to the target variable, such as by a measure of data on the target variable on each continuous variable. Examples of techniques and criteria for ordering the potential regressors 108 include mutual information of the target and continuous variables, correlation of the target and continuous variable, and the number of available cases. Those skilled in the art will understand and appreciate other approaches that can be employed to measure the target variable relative to the continuous variables to aid in ordering the potential regressors. In accordance with an aspect of the present invention, the system 100 can employ a fixed set of regressors for use in constructing the model, such as in connection with a progressive fixed regressive search. Alternatively, a variable set of the potential regressors can be used to generate the model, such as which can incrementally increase the number of regressors during a structure searching process.

In order to generate the model, the system includes a model generator 110 programmed and/or configured to implement scoring and searching techniques in accordance with an aspect of the present invention. The scoring and searching can be based on the data 104 and the variables 106, including the potential regressors 108. The model generator 110 initializes the model 102 as a decision graph, for example, that includes a single leaf with no splits. The model generator 110 includes a split leaf operator 112 and scoring mechanism 114. The split leaf operator 112, which can be part of a greedy search algorithm, operates on each leaf for each of the variables 106. Each variable can include one or more split value. The scoring mechanism 114 computes a score at the leaf to which the split leaf operator was applied. A score also can be generated for the overall model 102, which score corresponds to the sum of the scores at its leaves. A best split selector 116 chooses the best split (e.g., split variable and split value) for each leaf and applies the best split and associated split values to the leaf provided that the computed score improves.

In accordance with an aspect of the present invention, the split leaf operator 112 is iteratively applied to each leaf for each of the variables 106 and associated split values. The scoring mechanism 114 scores the resulting models at each leaf (e.g., a leaf score) according to the split variable and values. The best split selector 116, in turn, selects the split that results in the largest (non-negative) increase in model score for each respective leaf. During the iterative process, each model generated by application of the split leaf operator 112 can be temporarily stored as a submodel 118 during the iterative process. Further, the model score and structure for each submodel that results in an increase in the model score relative to previous submodels can be stored at 120, which corresponds to the best split unless another split at the leaf provides a higher score. This iterative process is applied to each leaf to grow the model accordingly. If no split on any leaf yields a higher score, then the model generator 110 terminates the search and provides the submodel 118 having the highest score as the resulting regression model 102. The resulting model 102 has a structure that includes one or more non-leaf nodes and a plurality of leaves, which are connected to associated non-leaf nodes by directed edges. At least some of the leaves (and suitably all leaves) include linear regressions on selected variables.

Those skilled in the art will understand and appreciate that the model generator 110 can be employed to generate the model as having any type of decision graph structure. Such a model structure, for example, can include two or more leaves, in which one or more of the leaves include at least one nontrivial linear regression. A decision graph, however, further permits non-root nodes to include more than one parent (e.g., constituting a merge), thus providing a richer model structure than a tree structure.

Thus, in accordance with another aspect of the present invention, the model generator 110 also can include a merge operator 122. The merge operator 122 is programmed to implement a merge of two or more leaves. The merge operator 122 can be implemented in conjunction with the split leaf operator 112 during construction of the decision graph model 102.

For example, the merge operator 122 can merge together two or more leaves having similarities, such as similar or identical regressors. The leaf node resulting from the merge thus has more than one parent to provide a corresponding submodel 118. The scoring mechanism 114, in turn, computes a Bayesian score for the resulting submodel 118. The score for this submodel further can be compared relative to a score for a corresponding submodel provided by the split leaf operator at a respective leaf. If the submodel resulting from the merge implemented relative to a given leaf has a higher score than a submodel resulting from the split leaf operation at such leaf, the merge is implemented and the submodel is stored as the best model 120. If the split leaf operator 112 for a split leaf variable results in a higher score than the merge, the submodel resulting from application of that split leaf operation can be stored at 120.

As mentioned above, to be stored as the best model 120, the submodel score should be higher than previously produced submodels (e.g., by other split leaf or merge operations). Additionally, the merge operation can be performed iteratively relative to a decision graph model, such that different subsets of leaves are merged and scored during the respective iterations. The merge resulting in highest score can be stored as the best model 120, provided its score is higher than other previous generated submodels.

Calculate Bayesian Score:

In accordance with an aspect of the present invention, the scoring mechanism 114 computes a Bayesian score of the model 102 or submodel 118 being scored. For purposes of continuity and simplicity of explanation, much of the following description relates to computing the Bayesian score for an ART(p) model, although those skilled in the art will understand and appreciated that such technique can be easily extended to other types of decision graph model structures based on the following discussion.

To facilitate efficient computation, it is desirable to implement the scoring mechanism 114 to compute model scores in closed form and factor according to the structure of the decision tree, such as according to the technique disclosed in *A Bayesian approach to learning Bayesian networks with local structure*, In Proceedings of Thirteenth Conference on Uncertainty in Artificial Intelligence, by Chickering, D., Heckerman, D., and Meek, C., Providence, R.I. Morgan Kaufmann (1997). For these reasons, the two following assumptions can be made in connection scoring:

(1) the a priori likelihood of a model structure s is given by:

$$p(s) = \kappa^{|\theta|} \quad \text{Eq. 8}$$

where $0 < \kappa \leq 1$ and $|\theta|$ is the number of model parameters.

For example, a fixed value can be used for $\kappa$ (e.g., $\kappa = 0.1$ is a value found to work well for many other domains); and (2) the parameters $\theta_1, \ldots, \theta_L$—the parameters associated with the leaves of the decision tree—are mutually independent. Together, these assumptions imply:

$$\text{score}(s) = \prod_{i=1}^{L} \text{LeafScore}(l_i) \quad \text{Eq. 9}$$

where $$\text{LeafScore}(l_i) = \quad \text{Eq. 10}$$

$$\kappa^{p+2} \int \prod_{x^t \text{ at } l_i} f_i(x_{p+1}^t \mid x_1^t, \ldots, x_p^t, \theta_i, s) p(\theta_i \mid s) d\theta_i$$

and where $f_i$ is the Normal distribution corresponding to the linear regression at leaf $l_i$, as described above in Eq. 3. LeafScore($l_i$) is the product of (1) the prior probability of the leaf-component of the structure (e.g., there are p+2 parameters at each leaf) and (2) the marginal likelihood of the data that falls to the leaf.

The remaining ingredient for the Bayesian score is the parameter prior, such as the traditional conjugate prior for a linear regression. For example, it is assumed that $\theta_i$ has a normal-gamma prior, such as disclosed in *Bayesian Theory*, by Bernardo, J., and Smith, A. John Wiley and Sons, New York (1994). It is to be appreciated that the leaf score can be computed in closed form and has a computational complexity of $O(p^3 + p^2 C_i)$, where $C_i$ is the number of cases that fall to leaf $l_i$. An example of an algorithm that can be employed to derive the leaf score is described below Derivation of Leaf Score Formulas:

This provides an example as how the formulas for LeafScore($l_i$) given by Eq. 10, can be derived for use in learning a model in accordance with an aspect of the present invention. This derivation further demonstrates how to derive the formula for $\tilde{\theta}_i$, which corresponds to the maximum a posteriori (MAP) parameters for a linear regression at leaf $l_i$ (see, e.g., Eq. 21 herein). The MAP parameters are particularly useful for employing an ART model for time series predictions in accordance with an aspect of the present invention.

The derivation of the formulas for LeafScore($l_i$) are based in part on a paper entitled *Learning Bayesian networks: A unification for discrete and Gaussian domains* by Heckerman, D., and Geiger, D., presented In Proceedings of Eleventh Conference on Uncertainty in Artificial Intelligence, Montreal, Quebec, pp. 274-284, Morgan Kaufmann (1995) (See also Technical Report TR-95-16, Microsoft Research, Redmond, Wash.). This paper makes the following assumptions for a set of observations $d = (x^1, \ldots, x^N)$ where each $x^t = (x_1^t, \ldots, x_{p+1}^t)$ is an observation over variables $X = (X_1, \ldots X_{p+1})$:

(1) the likelihood of the data for a given model structure s is $$\Pi_{i=t}^{N} p(x_i^t, \ldots, x_{p+1}^t \mid \mu, W, s) \quad \text{Eq. 11}$$

where each term is a multivariate-Normal distribution with unknown mean vector $\mu$ and precision matrix W, (2) p(W|s) is a Wishart distribution, and (3) p($\mu$|W, s) is a multivariate-normal distribution.

Under these three assumptions, it follows that the relationship between $X_{p+1}$ and $X_1, \ldots, X_p$ is the linear regression represented by Eq. 12 as follows:

$$p(x_{p+1}^t \mid x_1^t, \ldots, x_p^t, \theta, s) = N\left(m + \sum_{j=1}^{p} b_j x_p, \sigma^2\right), \quad t = 1, \ldots N \qquad \text{Eq. 12}$$

where, $$m = \mu_{p+1} - \sum_{i=1}^{p} b_1 \mu_i, \quad b_j = \qquad \text{Eq. 13}$$

$$\sum_{i=1}^{p} (W^{-1})_{p+1,i} \left(((W^{-1})^{p \times p})^{-1}\right)_{ij}, \quad \sigma^2 = 1/W_{p+1,p+1}.$$

Equation 13 uses a vector-matrix notation in which $v_i$ denotes the $i^{th}$ element of vector $v$, $M_{ij}$ denotes the element in the $i^{th}$ row and $j^{th}$ column of matrix M, and $M^{p \times p}$ denotes the upper p×p sub-matrix of M. The three assumptions of the Heckerman et al. paper also imply that $\theta = (m, b_1, \ldots, b_p, \sigma^2)$ has a normal-gamma distribution. Thus, when the cases in d are identified with those that fall to leaf $l_i$ and $\theta$ in Eq. 12 is identified with $\theta_i$ in the foregoing description (e.g., the above section entitled "Calculate Bayesian Score"), the assumptions of the Heckerman et al. paper imply conditions leading to the expressions for LeafScore($l_i$) in Eq. 10 and $\tilde{\theta}$ in Equation 21 associated with forecasting (described below). Thus, those skilled in the art will understand and appreciate that the framework of the Heckerman et al. paper can be employed to derive these quantities.

Following the approach described in the Heckerman et al. paper, let $p(\mu \mid W, s)$ be a multivariate-normal distribution with mean $\mu_0$ and precision matrix $\alpha_\mu w (\alpha_\mu > 0)$, and $p(W \mid s)$ be a Wishart distribution with $\alpha_W$ degrees of freedom ($\alpha_W > p$) and positive-definite precision matrix $W_0$. Then, the MAP parameter values (e.g., those that maximize the probability of d given $\theta$ and s) are given by:

$$\tilde{\mu} = \frac{\alpha_\mu \mu_0 + N \mu_N^-}{\alpha_\mu + N} \quad \text{and} \quad \tilde{W}^{-1} = \frac{1}{\alpha_W + N - (p+1)} W_N \qquad \text{Eq. 14}$$

where $$W_N = W_0 + S_N + \frac{\alpha_\mu N}{\alpha_\mu + N} (\mu_0 - \mu_N^-)(\mu_0 - \mu_N^-)' \qquad \text{Eq. 15}$$

In these and subsequent equations, a vector $v$ is used to denote a column vector and $v'$ to denote the transpose of $v$ (a row vector). The terms $\mu_N^-$ and $S_N$ are the sample mean and scatter matrix, respectively, given by:

$$\mu_N^- = \frac{1}{N} \sum_{t=1}^{N} x^t \quad \text{and} \qquad \text{Eq. 16}$$

$$S_N = \sum_{t=1}^{N} (x^t - \mu_N^-)(x^t - \mu_N^-)' \qquad \text{Eq. 17}$$

The MAP values for $\theta = (m, b_1, \ldots, b_p, \theta)$ are obtained by transforming these expressions for $\tilde{\mu}$ and $\tilde{W}^{-1}$ according to the mapping in Eq. 13.

Given the assumptions from the Heckerman et al. paper, it also follows that the marginal likelihood is given by:

$$p(d \mid s) = \qquad \text{Eq. 18}$$

$$\pi^{-(p+1)N/2} \left(\frac{\alpha_\mu}{\alpha_\mu + N}\right)^{(p+1)/2} \frac{c(p+1, \alpha_W + N)}{c(p+1, \alpha_W)} |W_0|^{\frac{\alpha_W}{2}} |W_N|^{-\frac{\alpha_W + N}{2}}$$

where $$c(l, \alpha) = \prod_{i=1}^{l} \Gamma\left(\frac{\alpha + 1 - i}{2}\right). \qquad \text{Eq. 19}$$

In addition, $(X_1, \ldots, X_p)$ has a (p-dimensional) multivariate-normal distribution with unknown mean and precision, which shall be denoted $\mu^-$ and $W^-$, respectively. Furthermore, $p(\mu^- \mid W^-, s)$ has a multivariate-normal distribution with mean $\mu_0^-$ (the first p entries of $\mu$) and precision matrix $\alpha_\mu W^-$, and $p(W^- \mid s)$ is a Wishart distribution with $\alpha_W - 1$ degrees of freedom and precision matrix $W_0^-$, such that $(W_0^-)^{-1}$ is equal to the upper p×p sub-matrix of $(W_0^-)^{-1}$. Thus, if $d^-$ is the data d restricted to the variables $(X_1, \ldots, X_p)$, then the marginal likelihood $p(d^- \mid s)$ is given by the p-dimensional version of Equation 18, with $\mu_0$, $W_0$, and $\alpha_W$ replaced by $\mu_0^-$, $W_0^-$, and $\alpha_W$, respectively. Finally, the (conditional) marginal likelihood is given by $$\int \prod_{t=1}^{N} p(x_{p+1}^t \mid x_1^t, \ldots, x_p^t, \theta, s) p(\theta \mid s) d\theta_i = \frac{p(d \mid s)}{p(d^- \mid s)}. \qquad \text{Eq. 20}$$

Substituting the expression for $p(d \mid s)$ given by Equation 18 and the analogous expression for $p(d^- \mid s)$ into Equation 20, a formula for the marginal-likelihood component of LeafScore ($l_i$) is provided.

Those skilled in the art will understand and appreciate other ways in which appropriate leaf scoring formulas could be derived, all of which are contemplated as falling within the scope of the present invention.

Model Structure Search:

As mentioned above, the model generator 110 is programmed to learn the structure of regression decision graph models that utilize a model-structure score, such as described above. Various methods exist for learning a regression model in accordance with an aspect of the present invention. With particular reference to the subset of models relating to ART models, one method for learning the structure for an ART(p) model corresponds to a situation when p is chosen based on the data, which method corresponds to an ART model with variable p. Another method for learning the structure for an ART model, which results in an ART model with fixed p, corresponds to a situation when p is chosen irrespective of the data. It is to be understood and appreciated that the following approaches described for learning the ART models (e.g., the fixed p and variable p methods) can also be used to learn other types of regression models with fixed or variable p in accordance with an aspect of the present invention.

With reference back to FIG. 3, for example, the model generator 110 is operative learn an ART model with variable p, which includes learning the split variables and split values for a decision graph when the possible split variables are limited to the previous p time periods. In this approach, p is selected based on the data being modeled. The model generator 110 employs greedy search algorithm that employs the split-leaf operator 112. The split leaf operator 112 is applied to a leaf of a decision tree and takes two arguments, namely, a variable to split on and the value of the variable. For instance, the decision graph in FIG. 2 can be obtained by the application of split-leaf ($X_{i-1}$, −337) to the single leaf of an empty decision tree (e.g., the root) followed by the application of split ($X_{i-1}$, 0) to the right child of the decision tree resulting from the first split.

In an effort to reduce computational complexity, when applying the split-leaf operator 112 to leaf $l_i$, a restriction can be imposed to limit potentially splitting on seven values of each predictor variable, which can be discrete and/or continuous variables. These values are the boundaries of eight equiprobable contiguous regions of a normal distribution estimated from the restricted data set at the leaf for the predictor variable (for a justification of the choice of eight regions, see, e.g., *Efficient determination of dynamic split points in a decision tree*, by Chickering, Meek, and Rounthwaite, In The 2001 IEEE International Conference on Data Mining. IEEE Computer Society (2001)). While limiting the number of split points to seven works well across many domains, those skilled in the art will understand and appreciated that any number of split points (greater than or less than seven) could be used in accordance with an aspect of the present invention. The initial ART model 102 is a decision graph with a single leaf, that is, no splits.

The greedy searching procedure is generally computationally tractable. Recall that a single evaluation of a split-leaf operator applied to leaf $l_i$ has computational complexity $O(p^3+p^2 C_i)$, where $C_i$ is the number of cases that fall to leaf $l_i$. In addition, for each leaf, the searching is performed among p potential split variables and among k possible split points. Also, because the splits are binary, the number of leaf nodes that are evaluated for expansion is less than twice the number of leaves in the resulting tree. Thus, because $C_i$<T, the overall learning time can be represented by $O(kL(p^4+p^3T))$, where L is the number of leaves. As with other decision-tree learning algorithms, the learning time is a function of the size of the tree. Typically, as one increases the size of a data set, the size of the learned tree grows and thus the time to learn does not necessarily grow linearly in the size of the data set. Despite this potential super-linear scaling, it is to be appreciated that, empirically, decision-tree algorithms scale almost linearly for large data sets.

Another method for learning model structure corresponds to learning an ART model with fixed p (e.g., when p is chosen without regard for the data being modeled) by repeatedly using the method for learning an ART model with variables. In particular, an AR(i) model is learned for each $0 \leq i \leq p_{max}$, and the model with the highest Bayesian score is chosen. It is to be understood and appreciated that each of such methods of learning employs a greedy search algorithm to select among ART models.

Those skilled in the art will understand and appreciate that the foregoing model structure search can be extended to learning other types of decision graphs, including with fixed or variable p. For example, in addition to the split leaf operator to grow the model, a merge operator can be utilized to merge leaves, provided that such merge improves the model score.

Parameter Searching—Model Adjustments:

Referring again to FIG. 3, the system 100 also can include a model adjuster 124 that operates on the generated regression model 102 after the model structure has been determined. While the model adjuster 124 is illustrated as part of the model generator 110, it is to be understood and appreciated that it alternatively could be independent of the model generator. For example, the model adjuster, according to an aspect of the present invention, can be employed to implement model adjustments relative to any regression model.

The model adjuster 124 is operative to implement parameter searching by adjusting regressor variables at the leaves of the model 102 in accordance with an aspect of the present invention. The model adjuster 124 can generate submodels 118 during a model adjustment phase, which submodels can be created by adding or removing possible regressors at each leaf during an iterative process. Each time a regressor is added to or removed from a leaf, the scoring mechanism 114 scores the resulting submodel 118 to discern whether the adjustment has improved the model score. As the model improves, the improved model can be stored as the regression model 102.

For example, if a given leaf includes a given regressor, then the adjuster 124 can remove the regressor and the resulting submodel can be scored by the scoring mechanism 114. Similarly, if a given leaf does not include a given regressor, then the adjuster can add the regressor to the leaf and the submodel rescored by the scoring mechanism 114. Thus, the leaves can be adjusted in an iterative fashion by adding or removing regressors to improve the model score. It is to be appreciated that because the potential regressors 108 are arranged in order of usefulness, the iterative process at each leaf can be terminated if an adjustment with a regressor does not improve the model score. It is to be further appreciated that such parameter searching (e.g. pruning) by the model adjuster 124 can be used in conjunction with any type of regression model, such as may have been constructed according to any other methodology.

Figure 4:
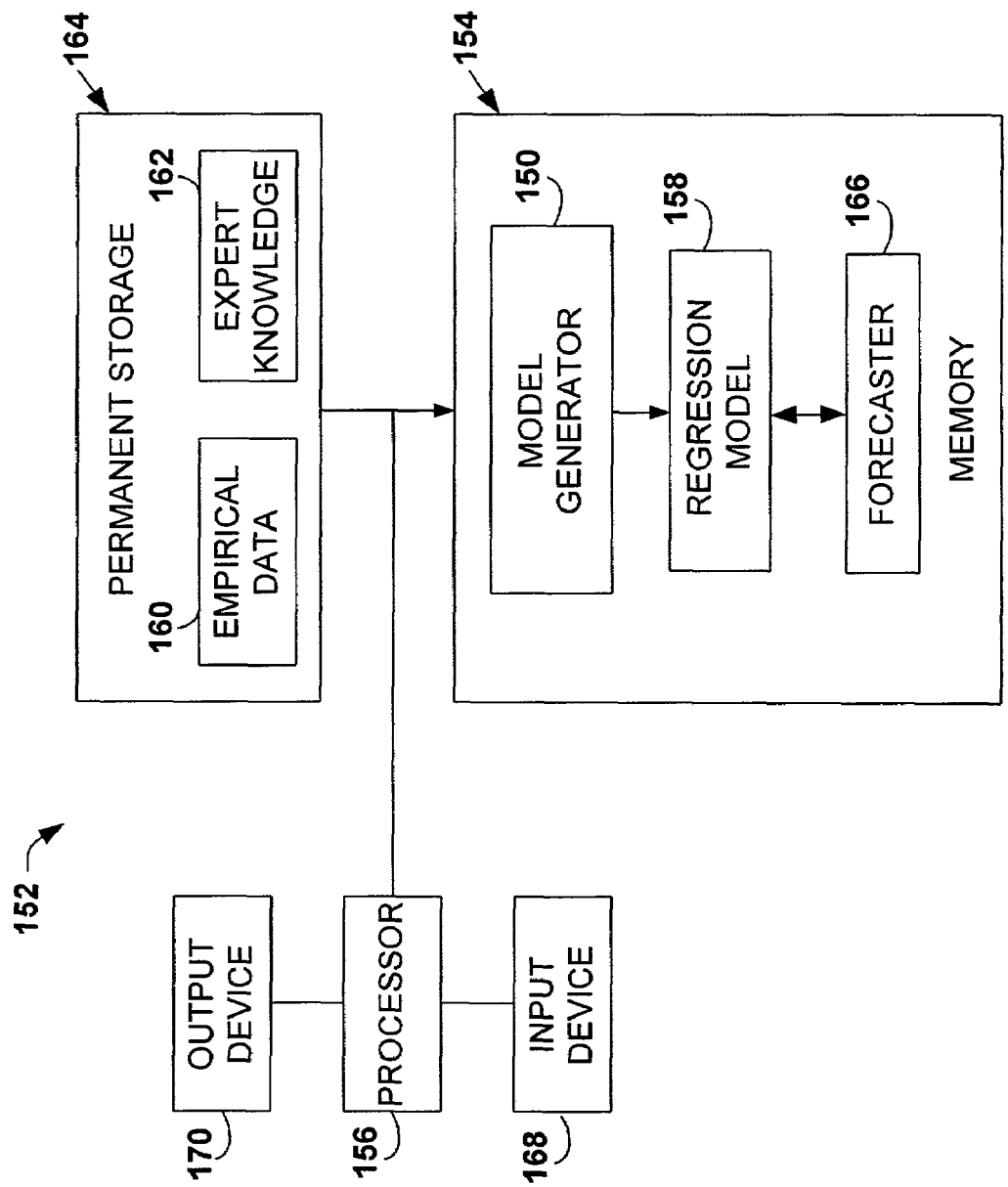
FIG. 4 is an example of a system that can generate a model and forecast based on a regression decision graph in accordance with an aspect of the present invention.

Implementation of Model Generator and Forecaster:

FIG. 4 depicts an example of regression decision graph model generator 150 implemented within a computer system programmed to construct a decision graph model 152, including an ART model or ART(p) model, in accordance with an aspect of the present invention. The model generator 150 is illustrated as residing within a memory 154 coupled to a central processing unit (CPU) 156. The model generator 150, for example, includes computer executable instructions that reside in the memory 154 to generate a regression decision graph model 158 based on data. The data, for example, can include empirical data 160 and expert knowledge 162. In accordance with an aspect of the present invention, the model 158 corresponds to decision graph having linear regressions at its leaves, which provides a piecewise-linear regression model. In a particular implementation for time series data, the resulting model 158 can correspond to a piecewise-linear auto-regression model, which facilitates forecasting on the time series data.

By way of example, the expert knowledge 162 typically comprises a sample size, and the priors on structures for sample data, such as time series data, such as provided by an expert in a given field. The empirical data 160 and the expert knowledge 162 can reside in a permanent storage device 164. The empirical data 160 typically includes cases stored in a database ("an empirical data database"). With both the empirical data 160 and the expert knowledge 162, a user, such as a knowledge engineer, can employ the model generator 150 to generate the regression model 158 in accordance with an aspect of the present invention.

By way of example, the model generator 150 is operative to transform a data set (e.g., corresponding to time-series data) to a set of cases suitable for a regression analysis, such as based on the empirical data 160 and the expert knowledge 162. The set of cases can have a form in which "predictor variables" and "target variable" in the analysis correspond to the preceding values and current values, respectively, in the time series. This is a standard transformation when constructing regression models and those skilled in the art will understand and appreciate various ways to implement such transformation. The model generator 150 employs the data set and associated variables to learn a decision graph for the target variable corresponding to the model 158.

In accordance with an aspect of the present invention, the model generator 150 employs a Bayesian technique to learn the structure and parameters of the model 158. The Bayesian approach can include computing a Bayesian score for choosing a decision graph model structure as well as performing searching techniques in conjunction with the Bayesian score to identify good models from data. The search technique, for example, includes a greedy search algorithm that employs a split leaf operator and/or a merge operator so to grow the graph for the model so long as its score improves. It is to be appreciated that where the model generator is employed to learn a model having a decision tree structure, the merge operator can be omitted according to an aspect of the present invention. Where the resulting regression model 158 has two more leaves that include linear regressions, the model provides piecewise-linear model. Those skilled in the art will appreciate that error estimates for a regression model can differ between each of the pieces of the piece-wise linear model, and that the regression model allows there to be discontinuities between the piece-wise linear models.

The resulting regression model 158 can be employed by a forecaster 166 programmed to predict successive observations in the time series. In a particular aspect, the regression model 158 can be an autoregressive model having a tree structure (e.g., an ART model). The forecaster 166 can implement single-step or multi-step forecasting on the model 158. While the forecaster 166 is illustrated as residing in the memory 154, it is to be appreciated that the forecaster could be coupled remotely relative to computer system 152 that includes the model 158, such as in a distributed computing environment or an Internet-based application.

The CPU 156 also can be coupled to one or more user input devices 168 to receive user inputs for use in generating the model 158 and/or implementing forecasting based on the model. An output device (e.g., display, printer, and so forth) 170 also can be coupled to the CPU 156 to provide means to display aspects of the model generation process and/or forecasting based applying the regression model 158 to input data.

Forecasting Using Regression Decision Graph Models:

The following provides an example of forecasting that can be implemented relative to a particular subset of the regression decision graph model 158, namely the ART model, constructed (e.g., using Bayesian scoring criterion and with greedy searching) for time series data in accordance with an aspect of the present invention. The forecasting, for example, can be implemented in the system provided at 150, although other systems also could be employed to implement such forecasting in accordance with an aspect of the present invention. Generally speaking, given a sequence of observations, the task of forecasting is to calculate the distributions for future observations in the sequence. This section distinguishes between two types of forecasting: (1) one-step forecasting and (2) multi-step forecasting.

One-step forecasting generally relates to predicting a future variable $y_{T+1}$ given that $y_1, \ldots, y_T$ are known. For this situation, the posterior distribution for the variable $Y_{T+1}$ is a function of a single leaf node in the decision graph representing the corresponding ART model. In particular, using the conjugate priors (described above in the "Calculate Bayesian Score" section of this Description), each leaf in the tree has a conditional t-distribution for this variable. It is to be understood and appreciated that the normal distribution $f_i(y_t|y_{t-p}, \ldots, y_{t-1}, \theta_i)$, as described in Eq. 3, as well as other types of distributions can be employed instead of the appropriate t-distribution to compute such log-likelihoods. Thus, the normal distribution $f_i(y_t|y_{t-p}, \ldots, y_{t-1}, \theta)$ evaluated at the value of $\theta_i$ that is most likely given the data—the maximum a posteriori (MAP) value—can be expressed:

$$\tilde{\theta}_i = \operatorname*{argmax}_{x^t \text{ at } l_i} \prod f_i(x^t_{p+1} | x^t_1, \ldots, x^t_p, \theta_i, s)p(\theta_i | s) \quad \text{Eq. 21}$$

A more detailed derivation for $\tilde{\theta}_i$ is provided above in the "Derivation of Leaf Score Formulas" section.

Multi-step forecasting relates to predicting values for variables at multiple future time steps. When forecasting more than one step into the future, a simple lookup generally is not possible due to non-linearities in the ART model. For example, given ART model from FIG. 2, assume that one desires to predict $X_4$, $X_5$, and $X_6$ when the values for only $X_1$ and $X_2$ are known. The prediction for $X_4$ does not correspond to a single leaf because the value of $X_3$ is unknown. In such situations, one can apply a computationally efficient Monte Carlo approach, such as forward or logic sampling for conditional distributions. An example of the such an approach is described in a paper entitled *Propagation of uncertainty by probabilistic logic sampling in Bayes' networks*, by Henrion, M., In Proceedings of the Second Workshop on Uncertainty in Artificial Intelligence, Philadelphia, Pa., Association for Uncertainty in Artificial Intelligence, Mountain View, Calif. as well in a paper entitled *Uncertainty in Artificial Intelligence* 2, Kanal, L. and Lemmer, J., editors, pages 149-164, North-Holland, N.Y. (1988). In this approach, one samples $y_{T+1}$ given $y_1, \ldots, y_T$, then $Y_{T+2}$ given $y_1, \ldots, y_{T+1}$, and so on, using either the appropriate t-distribution or MAP (normal) distribution. These samples are then used as sample distributions from which one can estimate quantities of interest, such as the expected values and variances for variables at future time steps. Those skilled in the art will understand and appreciate other forward sampling techniques that also could be employed to perform multi-step forecasting using an ART model in accordance with an aspect of the present invention.

Figure 5:
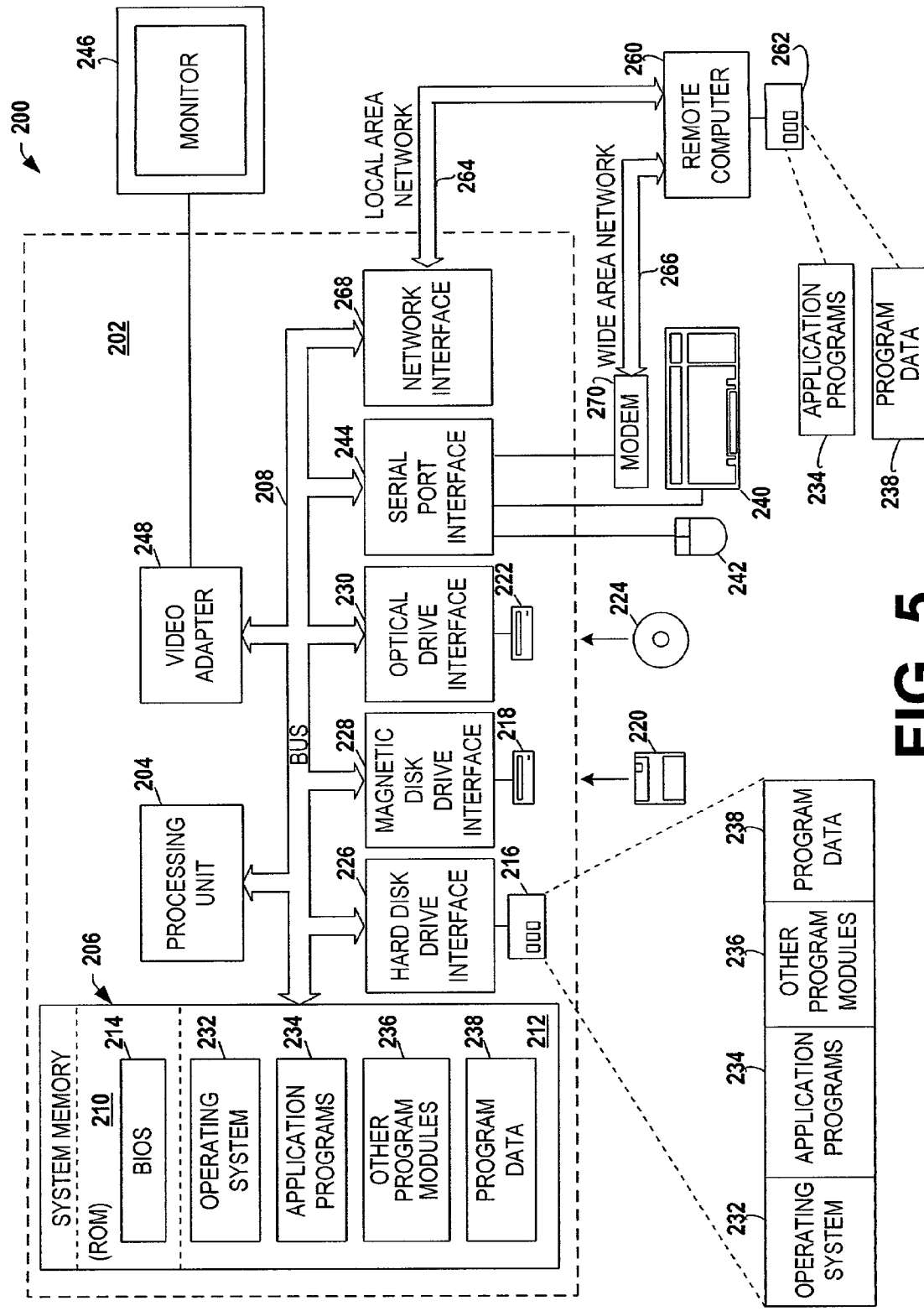
FIG. 5 is an example of an operating environment in which various aspects of the present invention can be implemented.

Possible Operating Environment:

In order to provide additional context for implementing various aspects of the present invention, FIG. 5 and the following discussion are intended to provide a brief, general description of a suitable computing environment 200 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 5, an exemplary system environment 200 for implementing the various aspects of the invention includes a conventional computer 202, including a processing unit 204, a system memory 206, and a system bus 208 that couples various system components, including the system memory, to the processing unit 204. The processing unit 204 may be any commercially available or proprietary processor. In addition, the processing unit may be implemented as multi-processor formed of more than one processor, such as may be connected in parallel.

The system bus 208 may be any of several types of bus structure including a memory bus or memory controller, a peripheral bus, and a local bus using any of a variety of conventional bus architectures such as PCI, VESA, Microchannel, ISA, and EISA, to name a few. The system memory 206 includes read only memory (ROM) 210 and random access memory (RAM) 212. A basic input/output system (BIOS) 214, containing the basic routines that help to transfer information between elements within the computer 202, such as during start-up, is stored in ROM 210.

The computer 202 also may include, for example, a hard disk drive 216, a magnetic disk drive 218, e.g., to read from or write to a removable disk 220, and an optical disk drive 222, e.g., for reading from or writing to a CD-ROM disk 224 or other optical media. The hard disk drive 216, magnetic disk drive 218, and optical disk drive 222 are connected to the system bus 208 by a hard disk drive interface 226, a magnetic disk drive interface 228, and an optical drive interface 230, respectively. The drives 216-222 and their associated computer-readable media provide nonvolatile storage of data, data structures, computer-executable instructions, etc. for the computer 202. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 200, and further that any such media may contain computer-executable instructions for performing the methods of the present invention.

A number of program modules may be stored in the drives 216-222 and RAM 212, including an operating system 232, one or more application programs 234, other program modules 236, and program data 238. The operating system 232 may be any suitable operating system or combination of operating systems. By way of example, the application programs 234 and program modules 236 can include a regression decision graph model generator and/or a forecaster that employs a regression model in accordance with an aspect of the present invention. Additionally, the program data 238 can include input data from which a model is generated and/or on which desired forecasting is performed in accordance with an aspect of the present invention.

A user can enter commands and information into the computer 202 through one or more user input devices, such as a keyboard 240 and a pointing device (e.g., a mouse 242). Other input devices (not shown) may include a microphone, a joystick, a game pad, a satellite dish, wireless remote, a scanner, or the like. These and other input devices are often connected to the processing unit 204 through a serial port interface 244 that is coupled to the system bus 208, but may be connected by other interfaces, such as a parallel port, a game port or a universal serial bus (USB). A monitor 246 or other type of display device is also connected to the system bus 208 via an interface, such as a video adapter 248. In addition to the monitor 246, the computer 202 may include other peripheral output devices (not shown), such as speakers, printers, etc.

It is to be appreciated that the computer 202 can operate in a networked environment using logical connections to one or more remote computers 260. The remote computer 260 may be a workstation, a server computer, a router, a peer device or other common network node, and typically includes many or all of the elements described relative to the computer 202, although, for purposes of brevity, only a memory storage device 262 is illustrated in FIG. 5. The logical connections depicted in FIG. 5 may include a local area network (LAN) 264 and a wide area network (WAN) 266. Such networking environments are commonplace in offices, enterprise-wide computer networks, intranets and the Internet.

When used in a LAN networking environment, for example, the computer 202 is connected to the local network 264 through a network interface or adapter 268. When used in a WAN networking environment, the computer 202 typically includes a modem (e.g., telephone, DSL, cable, etc.) 270, or is connected to a communications server on the LAN, or has other means for establishing communications over the WAN 266, such as the Internet. The modem 270, which can be internal or external relative to the computer 202, is connected to the system bus 208 via the serial port interface 244. In a networked environment, program modules (including application programs 234) and/or program data 238 can be stored in the remote memory storage device 262. It will be appreciated that the network connections shown are exemplary and other means (e.g., wired or wireless) of establishing a communications link between the computers 202 and 260 can be used when carrying out an aspect of the present invention.

In accordance with the practices of persons skilled in the art of computer programming, the present invention has been described with reference to acts and symbolic representations of operations that are performed by a computer, such as the computer 202 or remote computer 260, unless otherwise indicated. Such acts and operations are sometimes referred to as being computer-executed. It will be appreciated that the acts and symbolically represented operations include the manipulation by the processing unit 204 of electrical signals representing data bits which causes a resulting transformation or reduction of the electrical signal representation, and the maintenance of data bits at memory locations in the memory system (including the system memory 206, hard drive 216, floppy disks 220, CD-ROM 224, and remote memory 262) to thereby reconfigure or otherwise alter the computer system's operation, as well as other processing of signals. The memory locations where such data bits are maintained are physical locations that have particular electrical, magnetic, or optical properties corresponding to the data bits.

Methodologies

In view of the foregoing structural and functional features described above, methodologies in accordance with the present invention will be better appreciated with reference to FIGS. 6-9. While, for purposes of simplicity of explanation, the methodologies of FIGS. 6-9 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodologies can be implemented as computer-executable instructions, such as software stored in a computer-readable medium. Alternatively, the methodology may be implemented as hardware or a combination of hardware and software.

Figure 6:
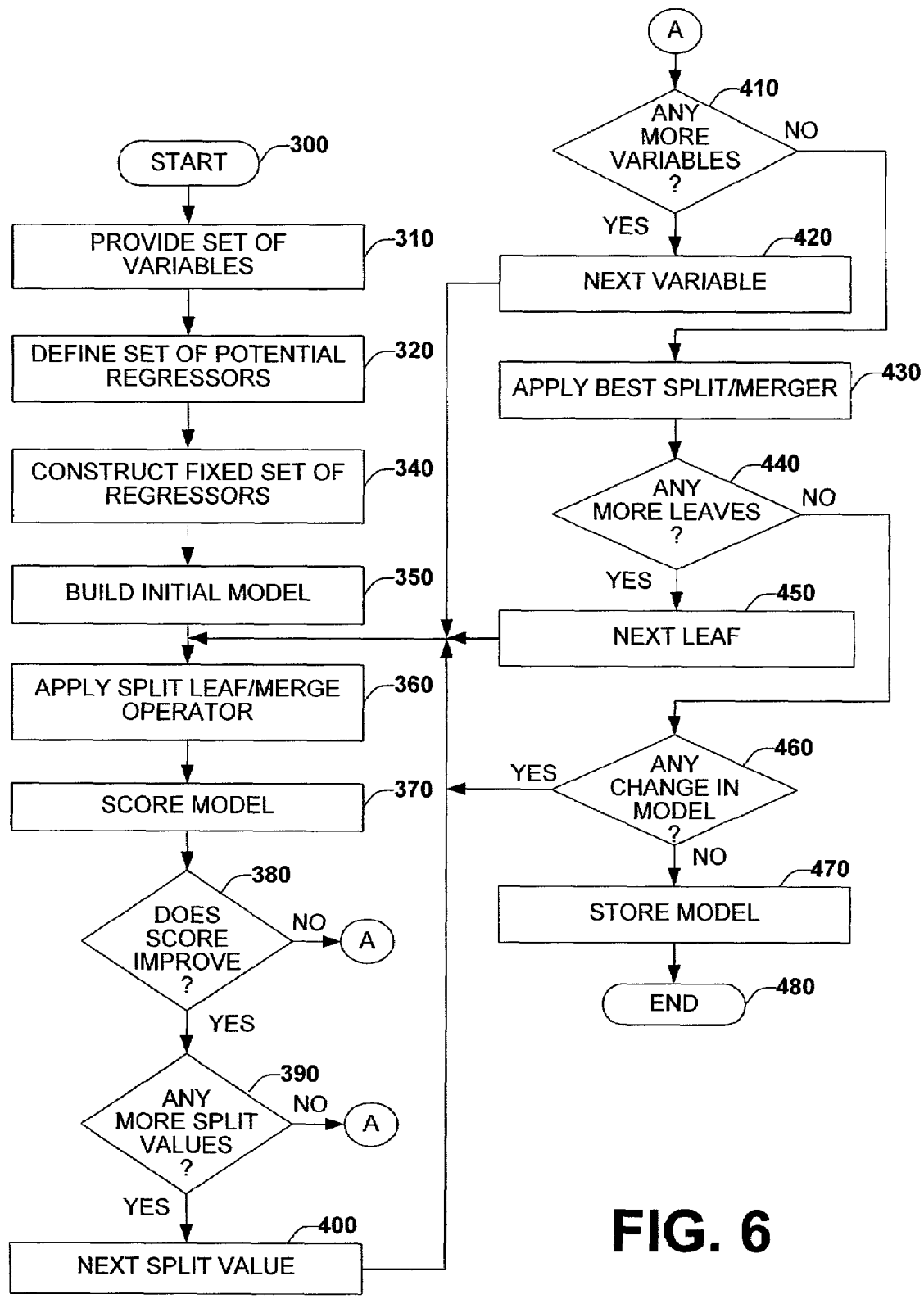
FIG. 6 is a flow diagram illustrating a methodology for constructing a regression decision graph model in accordance with an aspect of the present invention.

FIG. 6 illustrates a methodology for learning a regression decision graph model using a greedy search algorithm in accordance with an aspect of the present invention. The methodology begins at 300, such as in connection with initiating a model generator. This can include initializing variables, setting pointers and data sets to appropriate starting conditions.

Next, at 310, a set of variables is provided. The set of variables includes a target variable and predictor variables. The predictor variables can be continuous and discrete variables, such as selected based on expert knowledge according to the domain for which the model is being created. Next, at 320, a set of potential regressors is defined. The potential regressors can correspond to all or some of the continuous variables provided at 310. Next, at 340, a fixed set of regressors is constructed based on the data and expert knowledge. It is to be appreciated that the fixed set of regressors, for example, can include a selected portion of the potential regressors that can be arranged in a desirable order.

At 350, an initial model is built. The initial model, for example, includes a single node having no leaves. With the initial model, the methodology proceeds to 360. At 360, a split leaf operator can be applied to the initial node using a split value of a first variable of the set of variables provided at 310. The split leaf operator can be utilized when building any type of decision graph. It is to be appreciated that each variable can have any number of possible split values. The resulting model, which in the first iteration includes the initial root node and a pair of leaves that include linear regressions, is scored at 370. Linear regressions at the leaves, for example, can be computed according to Eqs. 2 and 3. The scoring, for example, is implemented by Bayesian scoring, such as described above.

After there are more than two leaves in the model, a merge operation also can be performed on the leaves at 360 to provide a resulting submodel. That is, at 360, one submodel can be generated based on application of the split leaf operator and another submodel based on application of the merge operator. The merge operation can be applied to two or more leaves, such as may have the same or similar regressors.

Next, at 380, a determination is made as to whether the score improves. If the score improves due to the split applied at the root node, the corresponding submodel can be stored and the methodology proceeds to 390. Similarly, if the merge operation results in a model having an increased score the submodel also can be stored with the methodology proceeding to 390. At 390, a determination is made as to whether there are anymore split values for the current variable utilized at 360. If there are more split values, the methodology proceeds to 400, in which the next split value for the current variable is obtained. From 400, the methodology returns to 360 in which the split leaf operator is applied to the same leaf (or root node for the first iteration) using the current variable and the split value obtained at 400.

If either determination at 380 or 390 is negative, the methodology proceeds to 410 via connector "A". That is, if the score obtained at 370 does not improve or if there are no more split values for the current variable, the methodology proceeds to 410 in which a determination is made as to whether there are any more variables for the current leaf (or root node for the first iteration). If there are more variables associated with the current leaf (or root node for the first iteration), the methodology proceeds to 420 in which the next variable is obtained. As mentioned above, each variable can have one or more associated split values for processing in accordance with the present invention. From 420, the methodology returns to 360, in which the split leaf operator is applied using the next variable and its first associated split value. It is to be appreciated that the merge operation at 360 further can be performed relative to different subsets of available leaves during different iterations with a given model.

If the determination at 410 is negative, indicating that there are no more variables associated with the current leaf, the methodology proceeds to 430. At 430, a best split/merge operation is applied relative to the submodels. The best split, for example, corresponds to the split applied during previous iterations associated with that leaf which provided the highest score. Similarly, the best merge corresponds to a merge of two or more leaves that produced the model having the highest score. Thus, the best split or best merge having the highest score can be stored as the best submodel at 430.

From 430, the methodology proceeds to 440 in which a determination is made as to whether there are any additional leaves. If there are additional leaves, the methodology proceeds to 450. At 450, the next leaf is obtained and the methodology returns to 360. Thus, the foregoing loop can be repeated for each leaf of the model. That is, the split leaf operator and scoring are iteratively applied at each leaf for each possible variable and associated split values for such variables to progressively grow the model while the model is changing. A merge operator also can be applied for situations when the model being generated corresponds to a more general form of decision graph, which can include merges at non-root nodes.

If the determination at 440 is negative, indicating that there are no additional leaves in the model, the methodology proceeds to 460. At 460, a determination is made as to whether there have been any changes in the model. If there are changes in the model, the methodology proceeds to 360 in which the split leaf/merge operator is applied to the leaves for the associated variables. If there are no changes in the model after applying the split leaf operator during the previous iteration, the methodology proceeds from 460 to 470 in which the model having the best score is stored. After the model is stored, the process ends at 480.

Those skilled in the art will understand and appreciate that this methodology provides a greedy search approach (e.g., hill climbing). While the greedy approach to scoring and searching for model structure is intractable, it provides an effective mechanism for building a regression decision graph model in accordance with an aspect of the present invention. It further is to be understood and appreciated that a merge operation at 360 can be omitted in situations when the methodology is employed to construct a regression decision tree in accordance with an aspect of the present invention.

Figure 7:
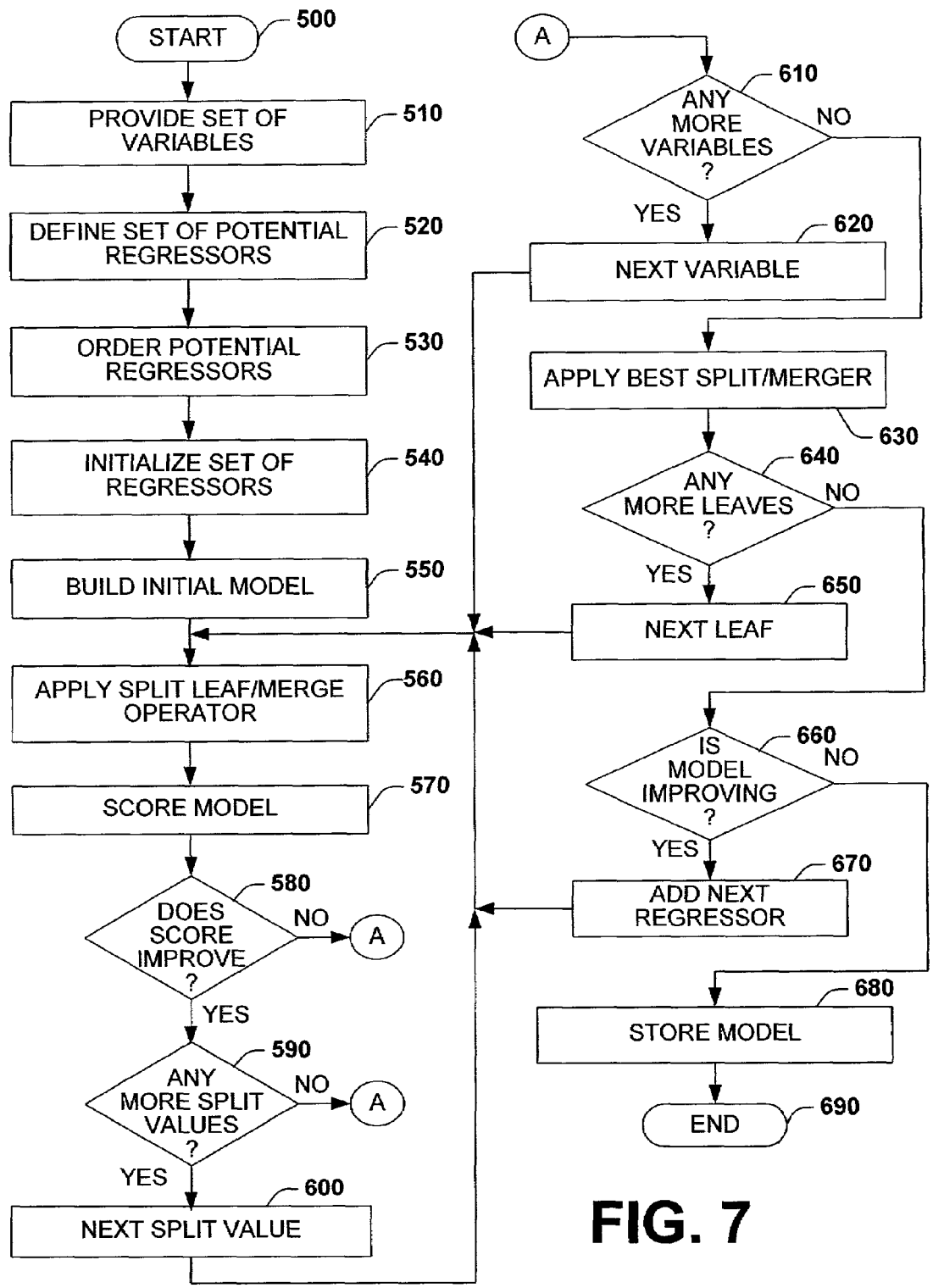
FIG. 7 is a flow diagram illustrating a methodology for constructing a regression decision graph in accordance with another aspect of the present invention.

FIG. 7 illustrates another approach for building a model in accordance with an aspect of the present invention. This methodology is similar to the fixed regressor search of FIG. 6, except that instead of a fixed set of regressors that are applied during the structure search (as in the methodology of FIG. 6), here a variable set of regressors are used with additional regressors being added so long as the model improves. Due to similarities between the respective searching approaches (e.g., both employ greedy searches), details of similar portions are simplified in the following description for FIG. 7.

The methodology begins at 500, such as in connection with initiating a model generator. At 510, a set of variables is provided, which includes a target variable and predictor variables. Next, at 520, a set of potential regressors is defined. The potential regressors are continuous variables. At 530, the potential regressors are ordered by likely usefulness. For example, the set of potential regressors can be ordered by mutual information of the target variable and continuous variables, correlation of the target variable and continuous variables or other algorithms available to define a set of measures relating the target variable and the variables comprising the potential regressors. Then, at 540, a set of regressors is initialized. During this first iteration, the set of regressors can include a null set or a first regressor, such as according to the order provided at 530.

At 550, an initial model is built, such as a single root node corresponding to the target variable. With the initial model, the methodology proceeds to 560. At 560, a split leaf operator is applied to the initial node using a split value of a first variable of the set of variables. A merge operator can also be applied to the model at 560, provided that the model includes more than two leaves and merges are permitted for the type of model being generated. For example, a merge operator would not be employed at 560 if the methodology were implemented to construct a regression tree model in accordance with an aspect of the present invention. The resulting model, which in the first iteration, includes the initial root node and a pair of leaves corresponding to linear regressions for the initial set of regressors (provided at 540). The model is then scored at 570, such as by a Bayesian scoring approach, as described herein.

Next, at 580, a determination is made as to whether the score improves. If the score improves due to the split applied at the root node, the corresponding submodel can be stored and the methodology proceeds to 590. Similarly, in situations when the merge operation is performed at 560, the storing and scoring can be implemented on the submodel resulting from the merge at 580.

At 590, a determination is made as to whether there are anymore split values. If there are more split values, the methodology proceeds to 600, in which the next split value for the current variable is obtained. From 600, the methodology returns to 560 to repeat 560-570 for the next split value.

If the determination at either of 580 or 590 is negative, the methodology proceeds to 610 via internal connector "A". That is, if the score obtained at 570 does not improve or if there are no more split values for the current variable, the methodology proceeds to 610 in which a determination is made as to whether there are any more variables for the current leaf (or root node for the first iteration) including the set of regressors. If there are more variables associated with the current leaf, the methodology proceeds to 620 in which the next variable is obtained. From 620, the methodology returns to 560, in which the split leaf operator is applied using the next variable and its first associated split value.

If the determination at 610 is negative, indicating that there are no more variables associated with the current leaf, the methodology proceeds to 630. At 630, a best split is applied to the current leaf to determine the best split obtained during previous iterations associated with that leaf which provided the highest score. From 630, the methodology proceeds to 640 in which a determination is made as to whether there are any additional leaves. If there are additional leaves, the methodology proceeds to 650 in which the next leaf is obtained and the methodology returns to 560 for additional processing. Thus, the foregoing loop can be repeated for each leaf of the model for the current set of regressors, such that the split variable operator and scoring are iteratively applied at each leaf for each possible variable and associated split values so as to grow the model in accordance with an aspect of the present invention. In addition, merges also can be iteratively applied when growing the model, as described herein If the determination at 640 is negative, indicating that there are no additional leaves in the model, the methodology proceeds to 660. At 660, a determination is made as to whether the model is improving. If the model has improved since its last iteration (e.g., due to split leaf or merge operations), the methodology proceeds to 670 in which the next regressor is added to the set of regressors. From 670, the methodology returns to 560 to repeat the iterations associated with 560-660. If the current model does not improve from the model generated during a previous iteration, the methodology proceeds from 660 to 680 in which the model having the best score is stored. Because the regressors are ordered by their likely usefulness, if adding a given regressor (based on the order at 530) does not improve the model score, then a "best" model has already been generated and the greedy search can be terminated. After the model is stored, the process ends at 690.

Figure 8:
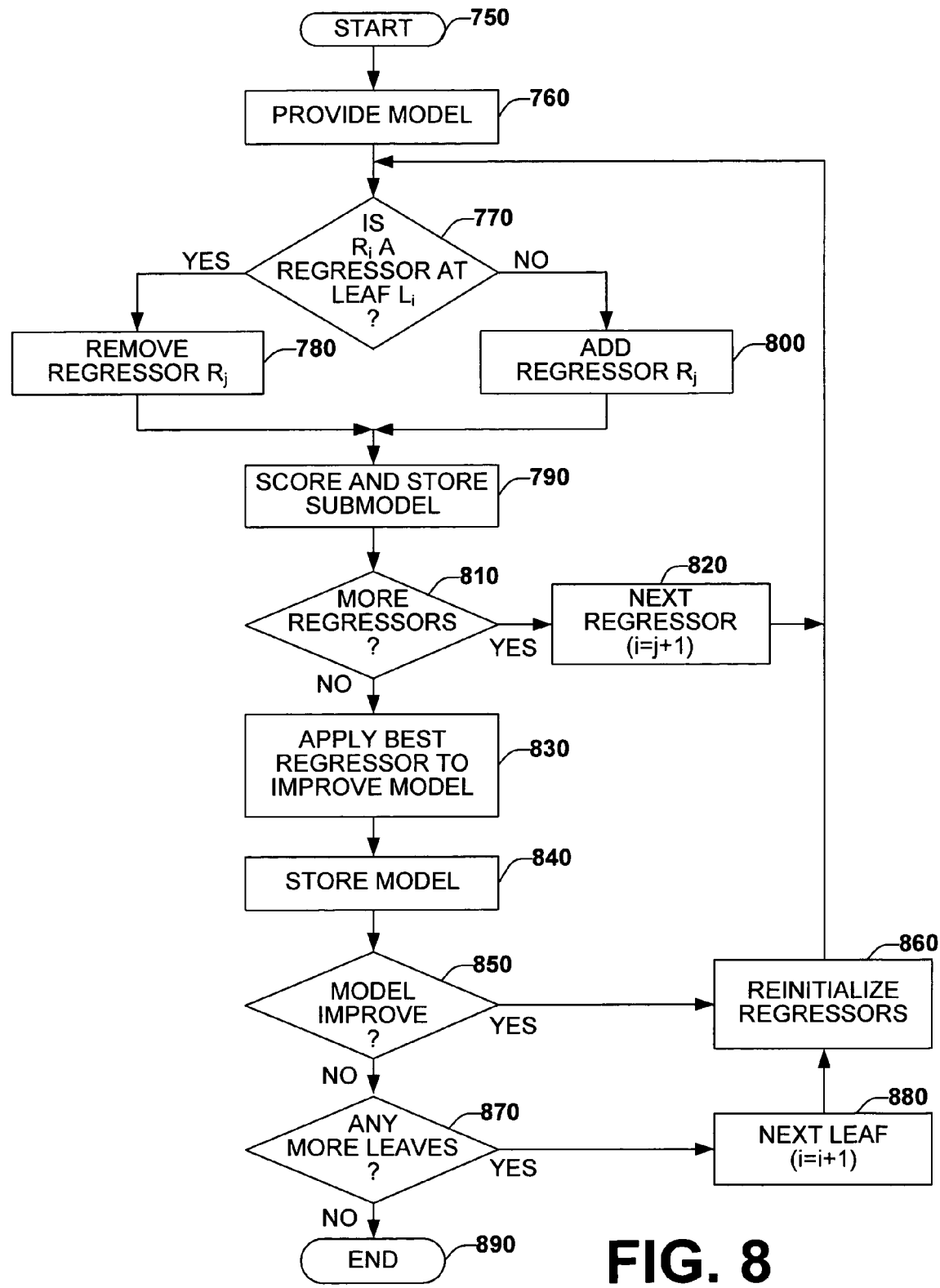
FIG. 8 is a flow diagram illustrating a methodology for learning model parameters of a regression decision graph model in accordance with an aspect of the present invention.

FIG. 8 depicts a parameter search methodology in accordance with an aspect of the present invention. Those skilled in the art will understand and appreciated that the following methodology for adjusting (or pruning) is applicable to various types of regression models (e.g., regression decision graph models, AR models, ART models, and so forth) in accordance with an aspect of the present invention.

The methodology begins at 750, such as in conjunction with activating a model adjuster at an associated computer. This can include loading associated components into active memory and initializing variables and pointers to their starting values for a given model. Next, at 760, a model is provided. As indicated above, the model can be any regression model. For example, the regression model can be generated according to a methodology, such as shown and described with respect to FIG. 7 or 8. Thus, the model includes linear regressions at its leaves. The linear regressions at respective leaves can include some or all possible regressors associated with the model. Thus, when a model is provided at 760, default values can be assigned for a starting leaf of the model and a set of potential regressors (R) can be initialized for use in connection with a first iteration of the methodology.

At 770, a determination is made as to whether a given possible regressor $R_j$ is a regressor at a given leaf $l_i$. If the given regressor $R_j$ is a regressor at the leaf $l_i$, the methodology proceeds to 780 in which the regressor $R_j$ is removed from the leaf $l_i$ of the model, thereby provided a corresponding submodel. Next, at 790, the submodel is scored. If, at 770, the given regressor $R_j$ is not a regressor of the leaf $l_i$, the methodology proceeds to 800. At 800, the regressor $R_j$ is added to the leaf $l_i$. From 800 the methodology also proceeds to 790 to score the resulting submodel. The model scoring, for example, is implemented according to a Bayesian scoring technique, which can include computing a score of the leaf $l_i$, as described herein.

After scoring the submodel at 790, the methodology proceeds to 810 in which a determination is made as to whether there are any more regressors that can be added or removed relative to the current leaf $l_i$. If more regressors exist, the methodology proceeds to 820 in which the next regressor is obtained for analysis, such as by incrementing to the next regressor $R_{j+1}$. The methodology then returns to 770 in which an additional adjustment of the model can be made at 780 or 800 depending on whether the next regressor $R_{j+1}$ is a regressor of the leaf $l_i$. If there are no more regressors for the current leaf $l_i$, the methodology proceeds from 810 to 830. At 830, the best regressor to improve the model is applied based on previous model adjustments. This can include comparing the scores of some or all of the submodels that have been generated for the leaf $l_i$ by adding or removing the regressors relative to the model. The submodel exhibiting the best score is stored at 840. The methodology proceeds to 850.

At 850 a determination is made as to whether the score of the model has improved. This determination, for example, includes comparing the best model stored at 840 from the last iteration with the model score for a preceding model stored at 840 (e.g., during a previous iteration). If the model for the last iteration has improved, the methodology proceeds to 860. At 860, the regressors are reinitialized to facilitate performing additional adjustments relative to the model stored at 840. In this situation, the reinitialization creates a set of regressors that precludes the regressor (or regressors) that were added or removed to provide the best model stored at 840. In this greedy approach, each iteration of this loop can result in an improved model by adding or removing a respective regressor relative to the leaf $l_i$. If the determination at 850 is negative, indicating that the model has not improved, the methodology proceeds to 870.

At 870, a determination is made as to whether there are any more leaves in the model provided at 760 for which adjustments can be made. If additional leaves exist, the methodology proceeds to 880 to increment in the model to the next leaf (e.g., $l_{i+1}$). From 880, the methodology proceeds to 860 in which the set of potential regressors also is initialized. The re-initialization of the regressors differs from that which occurs during iterations with a preceding leaf $l_i$. In particular, the iterations that occur with respect to the next leaf $l_{i+1}$ will be performed for all regressors associated with the model, as described above with respect to the 770-860. From 860, the methodology returns to 770. Thus, the adjustment (or pruning) process is implemented to iteratively add or remove possible regressors relative to each leaf in a greedy fashion so as to improve the model score. Once there are no more leaves and the model score does not improve any further, the methodology ends at 890, resulting in regression decision graph model in accordance with an aspect of the present invention.

Figure 9:
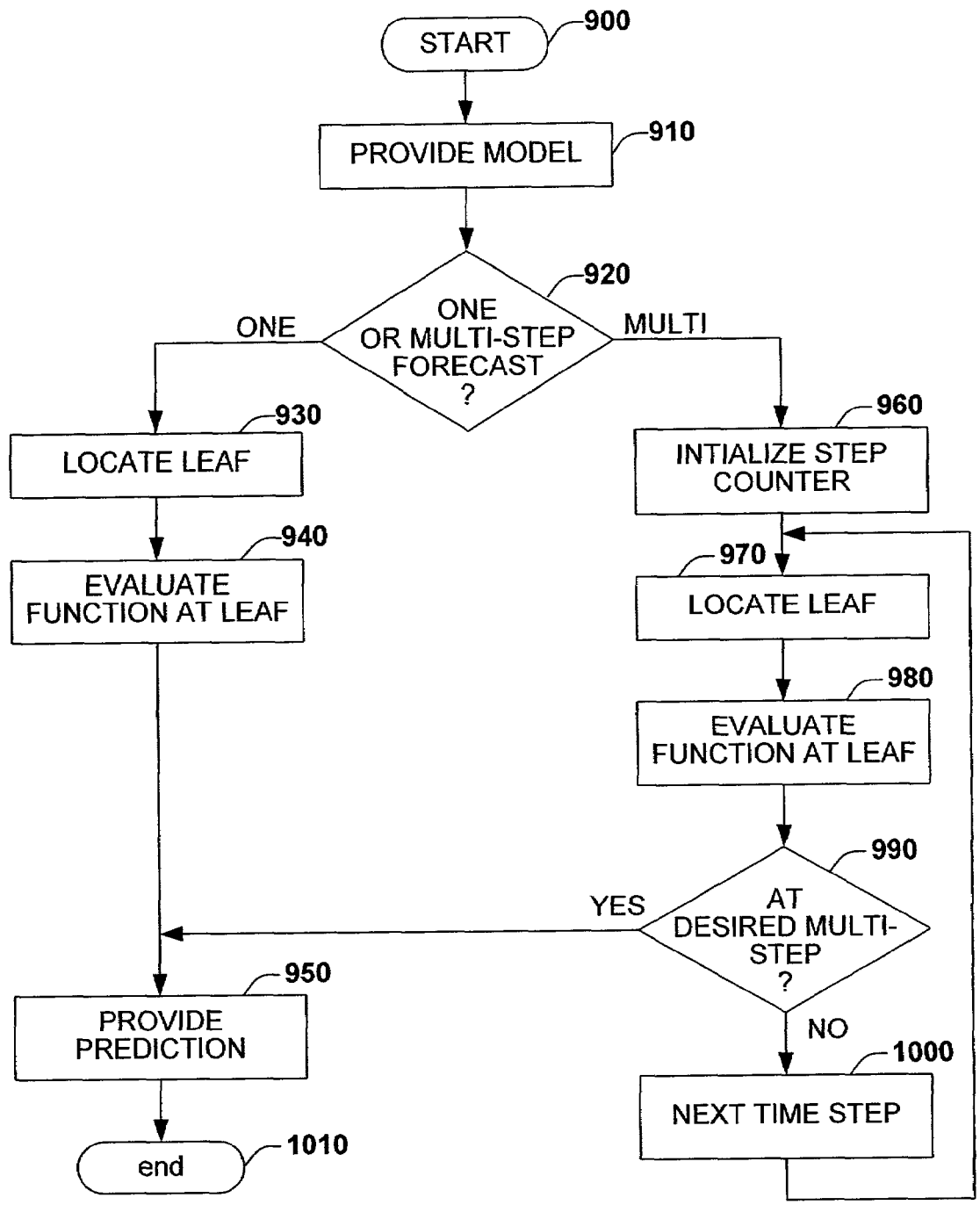
FIG. 9 is a flow diagram illustrating a methodology for forecasting in accordance with an aspect of the present invention.

FIG. 9 illustrates a methodology using a regression decision graph model, such as an ART model, to forecast, such as future observations in a sequence of time series data (e.g., univariate or multivariate data). The methodology begins at 900 such as in connection with initiating a forecasting process for a given set of time series data. At 910, a corresponding model is provided. The model, for example, can be generated from observed time series data based on any of the methods described herein, as well as other methods. The model has the form of a decision graph with linear regressions at its leaves, such as to provide a piecewise linear approximation the time-series data. The model further can be in the form of a decision graph having one or more merges or as a tree structure having no merges.

At 920, a determination is made as to whether the forecasting is to implemented as a single step or multi-step forecast. If a one-step forecast is being implemented, the methodology proceeds to 930. For this situation, the posterior distribution for the variable $Y_{T+1}$ is a function of a single leaf node in the tree. Thus, at 930 the leaf is located corresponding to the variable for which the prediction is desired. Then, at 940, the function at the node is evaluated to determine a corresponding value for the prediction. For example, the leaf has a distribution that provides the value for the prediction, which distribution can be a conditional t-distribution or the normal distribution, such as according to the form described in Eq. 3. This distribution is evaluated at the value of $\theta_i$ that is most likely given the data—the maximum a posteriori (MAP) value, such as represented by Eq. 21 above. The prediction value is then provided at 950 according to the evaluation at 940.

Figure 10:
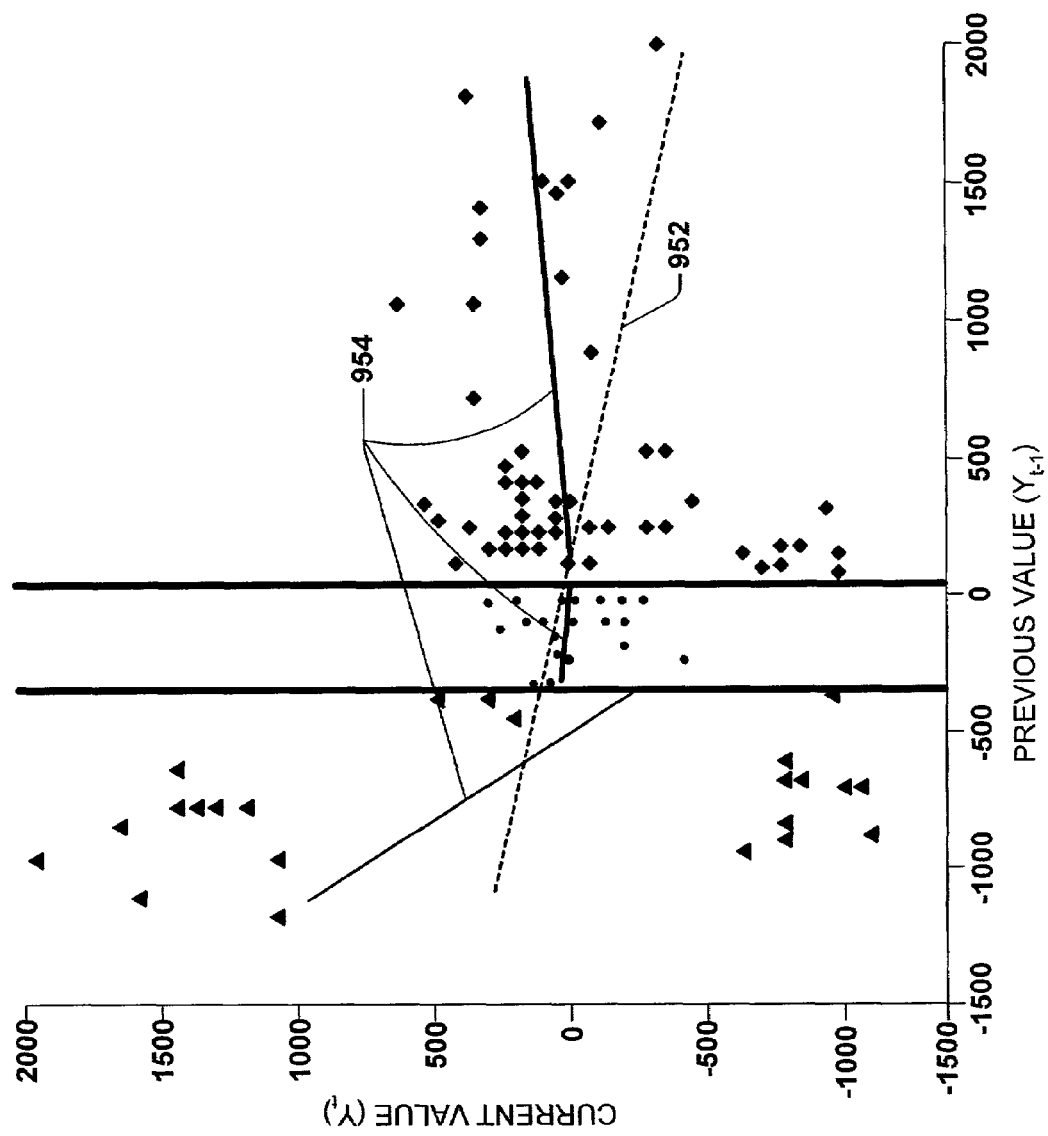
FIG. 10 is an example of different models generated for data represented as a scatter plot.

FIG. 10 illustrates the potential benefits of an ART model, constructed in accordance with an aspect of the present invention, as compared to an AR model, for example. FIG. 10 corresponds to the time series data (e.g., one of about 2,494 data sets). In this example, the data is shown as a scatter plot of $Y_t$ versus $Y_{t-1}$. Also shown on this plot are an AR(1) model 952 and an ART(1) model 954, which have been learned from the data. As shown in FIG. 10, the ART model 954 provides a piecewise linear approximation that fits the data more closely than does the conventional AR model 952. It is to be understood and appreciated that ART models that include additional predictor variables can provide further benefits over AR models, although it is difficult to illustrate such benefits with a simple (two-dimensional) figure, as depicted in FIG. 10.

Returning back to FIG. 9, if the determination at 920 indicates that the forecasting is to be implemented as a multi-step forecasting, the methodology proceeds to 960 in which a step counter is initialized for tracking a desired number of time steps needed to enable the desired multi-step prediction. Because the model does not include a single leaf having a function that can be evaluated to determine a prediction value for the future multi-step time step, intermediate variables are estimated based on previous data to, in essence, build the graph out to the desired future time step. For example, if the desired multi-step forecast is at three time steps in the future, two intermediate forecasts will be made prior to performing the desired multi-step forecast. At 970, an appropriate leaf is located and evaluated at 980, similar to the evaluation at 940, to provide a prediction value at a time step that precedes the time associated with the desired forecast. A plurality of evaluations can be employed by a computationally efficient Monte Carlo approach such as forward or logic sampling at such leaf to estimate the quantities of interest. Once a suitable estimate is obtained, the methodology proceeds to 990.

At 990, a determination is made as to whether an estimate has been made for the desired time step for which the multi-step forecast is being performed. If the methodology is not at the desired time step, the methodology proceeds to 1000 in which an estimation process is initiated for a next time step. Thus, 970 and 980 are repeated for each intermediate time step to generate samples at the intermediate time steps. The samples obtained at 970 and 980 are then used to estimate quantities of interest, such as the expected values and variances for variables at the intermediate future time steps. After an estimate is obtained for the desired multi-step, the methodology proceeds to 950 in which the prediction value is provided. After providing the prediction the methodology ends at 1010.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer-implemented data analysis method that makes predictions relative to time series data, the predictions related to nontrivial extractions of implicit, previously unknown information obtained by data mining within large amounts of data, the method comprising:

storing, in a memory communicatively coupled to a processor, computer-executable instructions for performing the method of making predictions relative to time series data, the predictions related to nontrivial extractions of implicit, previously unknown information obtained by data mining within large amounts of data;

executing the instructions on the processor, wherein the instructions result in data mining within the large amounts of data;

according to the instructions being executed:

employing a Bayesian model selection approach to construct a decision graph based on the data relating to observations of time series data, the decision graph having a model structure that includes at least two leaves, at least one leaf of the decision graph including at least one nontrivial linear regression wherein the Bayesian model selection approach comprising a greedy search algorithm to grow the model by adding leaves to a model so long as the model improves and performing a merge operation to the leaves after the model has more than two leaves;

providing a set of potential regressors having variables associated with the data, wherein the potential regressors are ordered in a descending order according to their correlation relative to a target variable to be predicted, the greedy search algorithm being performed iteratively relative to respective leaves of the model for a subset of potential regressors and, wherein the non-trivial linear regression at the at least one leaf corresponding to at least one variable of the set of potential regressors and the merge operator operates on at least two leaves so that at least one non-root node of the decision graph has more than one parent node;

computing a Bayesian score for a split leaf model and a merge model;

storing the model with the higher score computed Bayesian score;

repeating the performance of the greedy search and computation of the Bayesian score so long as the model score improves;

terminating the iterative process if a regressor does not improve the model score;

employing the decision graph to predict future observations in the time series data;

employing a split leaf operator at one leaf of the decision graph to grow the decision graph to include additional leaves, each of the additional leaves including at least one linear regression on at least one variable of the set of potential regressors;

storing or displaying the predicted future observations of the time series data, wherein the predicted future observations are based on the decision graph and include implicit, previously unknown information obtained from mining the data.

2. The method of claim 1, the split leaf operator being performed at the leaf for a variable selected to improve the model.

3. The method of claim 1, the greedy search algorithm being performed iteratively relative to respective leaves of the model for a fixed subset of the potential regressors so long as the model improves.

4. The method of claim 1, the greedy search algorithm being performed iteratively relative to respective leaves of the model for a subset of the potential regressors, a next regressor of the set of potential regressors being added to the subset with each subsequent iteration at a respective leaf so long as the model improves.

5. The method of claim 1, the potential regressors are continuous variables.

6. The method of claim 1, the at least one non-trivial linear regressor encoding a functional relationship as probability distributions that represent a structure of the model and model parameters.

7. The method of claim 1, further comprising scoring the model after growing the model via the greedy search algorithm to provide a model score, and comparing the model score of a current model relative to a previous model to discern whether the model is improving.

8. The method of claim 7, the scoring including computing a Bayesian score for each of the previous model and the current model to infer posterior distributions relating to at least one of the data, structures of the current and previous models, and model parameters.

9. The method of claim 8, the Bayesian score of each model being computed as a sum of the scores at the leaves of each respective model.

10. The method of claim 9, the score at a respective leaf being computed as a function of a structure prior and a marginal likelihood of the data that falls to the respective leaf.

11. The method of claim 7, model further comprising applying at least one of a split leaf operator and a merge operator to improve the model represented by the decision graph.

12. The method of claim 1, further comprising performing a parameter search on the model by progressively modifying regressors at respective leaves so long as the model improves.

13. The method of claim 12, the parameter search further comprising at least one of adding and removing a given regressor variable relative to a respective leaf in dependence upon whether the given regressor variable is at the respective leaf.

14. The method of claim 1, the at least one linear regression being of length p, where p corresponds to a fixed number of previous observations selected to provide a p-type Markov autoregressive tree model.

15. The method of claim 1, the decision graph is an autoregressive tree model comprising a plurality of leaves and at least one non-leaf node, the at least one non-leaf node being associated with a Boolean function for one of a plurality of variables having a split leaf value, each of leaves being associated with at least one linear regression of length p so as to provide a piecewise linear autoregressive tree model to facilitate forecasting future observations in the time series data.

16. The method of claim 1, the decision graph is a regression decision graph model comprising a plurality of leaves and at least one non-leaf node, the at least one non-leaf node being associated with a Boolean function for one of a plurality of variables having a split leaf value, each of leaves being associated with at least one linear regression so as to provide a piecewise linear regression decision graph model.

17. The method of claim 1, wherein the decision graph comprises a plurality of leaves and at least one non-leaf node, wherein the at least one non-leaf node is associated with a Boolean function for one of a plurality of variables having a split leaf value, and wherein each of the plurality of leaves is associated with at least one linear regression so as to provide a piecewise linear regression decision graph model.

18. The method of claim 1, the decision graph comprising a plurality of leaves and at least one non-leaf node, the at least one non-leaf node being associated with a Boolean function for one of a plurality of variables having a split leaf value, each of leaves being associated with at least one linear regression to provide a piecewise linear autoregressive tree model, the method further comprising employing the autoregressive tree model to predict future observations in the data.

19. A system that facilitates forecasting of time series data, comprising:
 a computer processor that stores, in a memory communicatively coupled to the computer processor, computer-executable instructions, the execution of which by the processor makes predictions relative to time series data and performs data mining of large amounts of data, the predictions related to nontrivial extractions of implicit, previously unknown information obtained by the data mining from the large amounts of data;
 a model generator that generates a decision graph employed for predicting future observations of time series data, the decision graph is structured as a regression model via a greedy search algorithm comprising:
 at least one non-leaf node associated with a Boolean function for one of a plurality of previous variables for the time series;
 a plurality of leaves, each of the plurality of leaves being associated with at least one functional formula corresponding to a non-trivial linear regression for previous observations in the time series data;
 respective edges associating respective the functional formulas of the plurality of leaves with parent nodes according to the Boolean functions along a path that includes each of the at least one non-leaf node that is a parent relative to the respective plurality of leaves;
 at least one non-root node of the decision graph having more than one parent node;
 a forecaster that employs the regression model obtained from the model generator to forecast one or more future observations of the time series data wherein the forecaster iterates through a set of potential regressors ordered in a descending manner of their correlation for a predicted variable associated with the one or more future observations, therefore terminating the greedy search algorithm when addition of a given regressor does not improve model score and performing a merge operation to the leaves after the model has more than two leaves and, wherein the non-trivial linear regression at the at least one leaf corresponding to at least one variable of the set of potential regressors and the merge operator operates on at least two leaves so that at least one non-root node of the decision graph has more than one parent node; and
 a display comprising output of the one or more future observations of the time series data, including predictions relative to time series data, the predictions related to nontrivial extractions of implicit, previously unknown information obtained by the data mining within the large amounts of data.

20. The system of claim 19, the forecaster being operative to predict future observations relative to a predictor variable as a function of a posterior distribution of at least one leaf of the regression model.

21. The system of claim 20, the forecaster computing the posterior distribution by evaluating the distribution at values for parameters that are most likely given the time series data.

22. The system of claim 20, the forecaster being operative to forecast at a desired future time step by estimating parameter values for a future observation and employing the estimated parameter values in subsequent estimations according to the number of future time steps so as to provide a model having estimated parameter values, the forecaster employing the regression model having estimated parameter values to estimate parameter values at the desired future time step.

23. A computer-implemented method of forecasting future observations in a sequence of time series data, comprising:
 storing, in a memory communicatively coupled to a processor, computer-executable instructions for performing the method of making predictions relative to the time series data, the predictions related to nontrivial extractions of implicit, previously unknown information obtained by data mining within large amounts of data;
 executing the instructions on the processor, wherein the instructions result in data mining within the large amounts of data;
 according to the instructions being executed:
 performing a greedy search to grow a model corresponding to the set of time series data represented by a decision graph having at least one non-trivial linear regression at leaves of the decision graph, the greedy search algorithm being performed iteratively relative to respective leaves of the model for a subset of potential regressors, wherein the potential regressors are arranged in the subset in a descending order of their correlation to a predicted variable;
 computing a Bayesian score for the model and, wherein the performance of the greedy search further comprising splitting a leaf node of the model into a pair of additional leaves, each of the additional leaves including at least one linear regression on at least one variable of a set of potential regressors and the performance of the greedy search further comprising merging at least two leaf nodes of the decision graph provided that the merging improves the Bayesian score for the model and the decision graph is a regression decision graph model comprising a plurality of leaves and at least one non-leaf node, the at least one non-leaf node being associated with a Boolean function for one of a plurality of variables having a split value, at least one non-root node of the regression decision graph model having more than one parent in the regression decision graph model, at least two leaves of the regression decision graph model being associated with at least one linear regression on at least one of the variables so as to provide a piecewise linear regression decision graph model;
 repeating the performance of the greedy search and computation of the Bayesian score so long as the model score improves;
 if the model score does not improve, terminating the modification and computation, and providing a model having a model structure corresponding to a decision graph having a fixed number of leaves that include at least one non-trivial linear regression;
 modifying a regressor variable at one of the leaves of the decision graph to provide a submodel;
 computing a Bayesian score for the submodel;

repeating the modifying and computation of the Bayesian score for the submodel so long as the score of the submodel improves;

if the score of the submodel does not improve relative to a previous score of the submodel, providing the submodel with the highest model score as the regression model that best models future observations of the time series data; and employing the best regression model to generate the future observations of the time series data.

24. The method of claim 23, the splitting of the leaf being performed for a variable having a split value selected to improve the model.

25. The method of claim 23, a next regressor of the set of potential regressors being added to the subset of potential regressors for each subsequent iteration at a respective leaf so long as the model improved relative to a preceding iteration.

26. The method of claim 23, the performance of the greedy search being performed iteratively relative to respective leaves of the model for a fixed subset of potential regressors so long as the model improved relative to a preceding iteration.

27. The method of claim 23, the at least one non-trivial linear regressor encoding a functional relationship as probability distributions that represent a structure of the model and associated model parameters.

28. The method of claim 23, further comprising computing Bayesian scores for a previous model and a current model and inferring posterior distributions relating to at least one of the data, structures of the current and previous models, and model parameters of the current and previous models.

29. The method of claim 23, the computation of the Bayesian scores for the model and submodel being computed as a sum of the Bayesian scores at the respective leaves.

30. The method of claim 29, the score of a respective leaf being computed as a function of a structure prior and a marginal likelihood of the data that falls to the respective leaf.

31. The method of claim 23, the modification further comprising at least one of adding and removing a given one of a plurality of potential regressor variables relative to respective leaves of the decision graph in dependence upon whether the given regressor variable is at the respective leaf.

32. The method of claim 23, further comprising transforming the time series data into a transformed data set having a plurality of data subsets of length p, where p corresponds to a fixed number of consecutive observations of the time series data.

33. The method of claim 23, the decision graph is an autoregressive tree model comprising a plurality of leaves and at least one non-leaf node, the at least one non-leaf node being associated with a Boolean function for one of a plurality of variables having a split value, at least two of the leaves being associated with at least one linear regression on at least one of the variables so as to provide a piecewise linear autoregressive tree model to facilitate forecasting relative to the time series data.

34. A method of predicting future observations of time series data, comprising:

storing, in a memory communicatively coupled to a processor, computer-executable instructions for performing the method of making predictions relative to the time series data, the predictions related to nontrivial extractions of implicit, previously unknown information obtained by data mining within large amounts of data;

executing the instructions on the processor, wherein the instructions result in data mining within the large amounts of data;

according to the instructions being executed:

employing a Bayesian model selection approach to construct a decision graph having a model structure that includes at least two leaves, at least one leaf of the decision graph including at least one non-trivial linear regression;

the Bayesian model selection approach comprising a greedy search algorithm to grow the model by adding leaves to the model so long as the model improves;

providing a set of potential regressors having variables associated with the data, wherein the potential regressors are ordered according to their correlation ranging from a most useful regressor to a least useful regressor relative to a target variable to be predicted;

employing the decision graph to predict one or more future observations in the time series data and performing a merge operation to the leaves after the model has more than two leaves and, wherein the non-trivial linear regression at the at least one leaf corresponding to at least one variable of the set of potential regressors and the merge operator operates on at least two leaves so that at least one non-root node of the decision graph has more than one parent node; and storing or displaying the one or more future observations.

35. A method of forecasting relative to time series data, the instructions comprising:

storing, in a memory communicatively coupled to a processor, computer-executable instructions for performing the method of making predictions relative to the time series data, the predictions related to nontrivial extractions of implicit, previously unknown information obtained by data mining within large amounts of data;

executing the instructions on the processor, wherein the instructions result in data mining within the large amounts of data;

according to the instructions being executed:

performing a greedy search to grow a model corresponding to the set of time series data represented by a decision graph having at least one non-trivial linear regression at leaves of the decision graph, the greedy search algorithm being performed iteratively relative to respective leaves of the model for a subset of potential regressors, wherein the potential regressors are arranged in the subset in a descending order of their correlation to a predicted variable and performing a merge operation to the leaves after the model has more than two leaves and, wherein the non-trivial linear regression at the at least one leaf corresponding to at least one variable of the subset of potential regressors and the merge operator operates on at east two leaves so that at least one non-root node of the decision graph has more than one parent node;

computing a Bayesian score for the model;

repeating the performance of the greedy search and computation of the Bayesian score so long as the model score improves;

if the model score does not improve, providing a model having a model structure corresponding to a decision graph having a fixed number of leaves that include at least one nontrivial linear regression; and modifying a regressor variable at one of the leaves of the decision graph to provide a submodel;

computing a Bayesian score for the submodel;

repeating the modifying so long as the score of the submodel improves; if the score of the submodel does not improve relative to a previous model score, providing the regression decision graph model with the highest model score as a most likely model that provides a most accurate future observation for the time series data; and storing or displaying the future observation of the time series data.

36. A computer implemented system for predicting future observations of time series data having a set of associated variables, comprising:

means for making predictions relative to the time series data, the predictions related to nontrivial extractions of implicit, previously unknown information obtained by data mining within large amounts of data;

means for data mining within the large amounts of data;

means for learning a model structure via a greedy Bayesian model selection approach for data corresponding to time series data for which a set of potential regressor variables have been created, the model structure comprising a decision graph that includes a plurality of leaves, at least one of the plurality of leaves including at least one linear regression on at least one continuous variable of the set of associated variables, wherein the potential regressors associated with the at least one linear regression are arranged in the set based on a descending order of their correlation for the at least one continuous variable;

means for learning model parameters at the leaves of the model structure by adjusting the at least one variable on which the at least one linear regression is implemented for the at least one of the plurality of leaves, wherein the means for learning model parameters further comprising means for one of either adding or removing a potential regressor of the set of associated variables relative to a given leaf to provide a submodel and the means for learning a model structure further comprising means for merging at least two leaves based on regressors contained in the least two leaves so that at least one non-root node of the decision graph has more than one parent node;

means for scoring the model in order to select a most suitable model to facilitate prediction; means for generating one or more future observations within the time series data by employing a highest scoring model as the most suitable model to predict the future observations;

means for storing the one or more predicted future observations obtained during the data mining; and means for splitting a leaf into a non-leaf node associated with one of the variables and a pair of leaves, wherein the means for splitting being applied iteratively to respective leaves of the model to grow the model so long as the means for scoring provides an improved model score.

37. The system of claim 36, the means for scoring computing a Bayesian score for the model, which corresponds to a sum of the scores at the respective leaves of the model.

38. The system of claim 36, the set of associated variables including one of a fixed set of potential regressors and a variable set of potential regressors, the linear regressions at the leaves of the model including linear regressions according to the one of the fixed set of potential regressors and the variable set of potential regressors.

39. The system of claim 36, further comprising means for selecting a best regressor to add or remove relative to the given leaf based on a score of each submodel; and means for storing the submodel as an improved model.

40. A computer-implemented method to forecast future observations for time series data having a plurality of possible regressor variables associated with observations of the time series data, the time series data derived from data mining, the method comprising:

storing, in a memory communicatively coupled to a processor, computer-executable instructions for performing the method of making predictions relative to time series data, the predictions related to nontrivial extractions of implicit, previously unknown information obtained by data mining within large amounts of data;

executing the instructions on the processor, wherein the instructions result in data mining within the large amounts of data;

according to the instructions being executed:

progressively modifying a given regressor variable of the model to form a submodel, the model having at least one linear regression on at least one of the plurality of possible regressor variables and the model constructed employing greedy search, wherein the plurality of possible regressor variables are arranged in a descending order of their correlation relative to a target variable;

computing a score for the submodel;

repeating the progressively modifying with another regressor variable of the plurality of possible regressor variables so long as the computed score improves;

improving the model by applying a highest scoring submodel as the regression model and performing a merge operation to leaves after the model has more than two leaves and, wherein the regression model comprises a regression decision graph model comprising a plurality of leaves and at least one non-leaf node, the at least one non-leaf node being associated with a Boolean function for one of a plurality of variables having a split value and at least one node of the decision graph having more than one parent node;

forecasting one or more future observations of the time series data by employing the regression model; and storing or displaying the one or more future observations.

41. The method of claim 40, the progressively modifying further comprising adding the given regressor variable to a respective leaf of the model to form the submodel.

42. The method of claim 41, the progressively modifying further comprising removing the given regressor variable to a respective leaf of the model to form the submodel.

43. The method of claim 40, the progressively modifying further comprising one of adding or removing the given regressor variable relative to a respective leaf of the model to form the submodel, the adding or removing being selected in dependence upon whether the given regressor variable is at the respective leaf.

44. The method of claim 40, the regression model comprising an autoregressive tree model comprising a plurality of leaves and at least one non-leaf node, the at least one non-leaf node being associated with a Boolean function for one of a plurality of variables having a split value.

* * * * *